United States Patent [19]

Schilling

[11] Patent Number: 5,185,762
[45] Date of Patent: Feb. 9, 1993

[54] SPREAD SPECTRUM MICROWAVE OVERLAY WITH NOTCH FILTER

[75] Inventor: Donald L. Schilling, Sand Point, N.Y.

[73] Assignee: SCS Mobilecom, Inc., Port Washington, N.Y.

[21] Appl. No.: 700,788

[22] Filed: May 15, 1991

[51] Int. Cl.⁵ .................. H04L 27/30; H04K 1/00
[52] U.S. Cl. .......................................... 375/1; 380/34
[58] Field of Search ..................... 375/1; 380/33, 34

[56] References Cited

U.S. PATENT DOCUMENTS

| | | |
|---|---|---|
| 3,831,013 | 8/1974 | Alsup et al. |
| 3,900,721 | 8/1975 | Speiser et al. |
| 4,112,372 | 9/1978 | Holmes et al. |
| 4,222,115 | 9/1980 | Cooper et al. |
| 4,238,850 | 12/1980 | Vance |
| 4,247,942 | 1/1981 | Hauer |
| 4,392,232 | 7/1983 | Andren et al. |
| 4,418,393 | 11/1983 | Zscheile, Jr. |
| 4,418,425 | 11/1983 | Fennel, Jr. et al. |
| 4,425,642 | 1/1984 | Moses et al. ........................ 275/1 |
| 4,455,651 | 6/1984 | Baran |
| 4,479,226 | 10/1984 | Prabhu et al. |
| 4,512,013 | 4/1985 | Nash et al. |
| 4,523,311 | 6/1985 | Lee et al. |
| 4,553,130 | 11/1985 | Kato |
| 4,563,774 | 1/1986 | Gloge |
| 4,606,039 | 8/1986 | Nicolas et al. |
| 4,612,637 | 9/1986 | Davis et al. |
| 4,621,365 | 11/1986 | Chiu |
| 4,647,863 | 3/1987 | Skubera, Jr. et al. |
| 4,649,549 | 3/1987 | Halpern et al. |
| 4,653,069 | 3/1987 | Roeder |
| 4,660,164 | 4/1987 | Leibowitz |
| 4,672,605 | 6/1987 | Hustig et al. |
| 4,672,629 | 6/1987 | Beier |
| 4,672,658 | 6/1987 | Kauehrad et al. |
| 4,675,839 | 6/1987 | Kerr |
| 4,680,785 | 7/1987 | Akiyama et al. |
| 4,691,326 | 9/1987 | Tsuchiya |
| 4,697,260 | 9/1987 | Grauel et al. |
| 4,703,474 | 10/1987 | Foschini et al. |
| 4,707,839 | 11/1987 | Andren et al. |
| 4,718,080 | 1/1988 | Serrano et al. |
| 4,730,340 | 3/1988 | Frazier, Jr. |
| 4,742,512 | 5/1988 | Akashi et al. |
| 4,759,034 | 7/1988 | Nagazumi |
| 4,789,983 | 12/1988 | Acampora et al. |
| 4,799,253 | 1/1989 | Stern et al. |
| 4,805,208 | 2/1989 | Schwartz |
| 4,807,222 | 2/1989 | Amitay |
| 4,837,802 | 6/1989 | Higashiyama et al. |

(List continued on next page.)

*Primary Examiner*—Salvatore Cangialosi
*Attorney, Agent, or Firm*—David Newman

[57] ABSTRACT

A spread spectrum CDMA communications system for communicating data and/or digitized voice between a plurality of users to a plurality of PCN units. The spread spectrum communications system is located within a same geographical region as occupied by an existing microwave system. The spread spectrum can operate without causing undue interference to the microwave system and the microwave system can operate without causing significant interference, less than 1% total users affected, to the PCN system. The spread spectrum CDMA communications system includes a plurality of PCN-base stations and a plurality of PCN units. A PCN-base station has a device for converting the format of the data into a form suitable for communicating over radio waves, a spread spectrum modulator for spread spectrum processing the data, a notch filter, and a transmitter for transmitting the spread spectrum processed converted data from the PCN-base station to a PCN unit. The PCN-base station also has an antenna, and spread spectrum detectors for recovering data communicated from the PCN units. A PCN unit has an antenna, and a detector coupled to the antenna for recovering data communicated from the PCN-base station. The detector includes a spread spectrum demodulator. Also, the PCN unit has a device for converting the format of the data into a form suitable for communicating over radio waves, spread spectrum modulator, an adjustable notch filter and a transmitter.

17 Claims, 25 Drawing Sheets

U.S. PATENT DOCUMENTS

| | | |
|---|---|---|
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,901,307 | 2/1990 | Gilhousen et al. . |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. . |
| 5,048,052 | 9/1991 | Hamatsu et al. . |
| 5,056,109 | 10/1991 | Gilhousen et al. ............ 375/1 |
| 5,103,459 | 4/1992 | Gilhousen et al. ............ 375/1 |

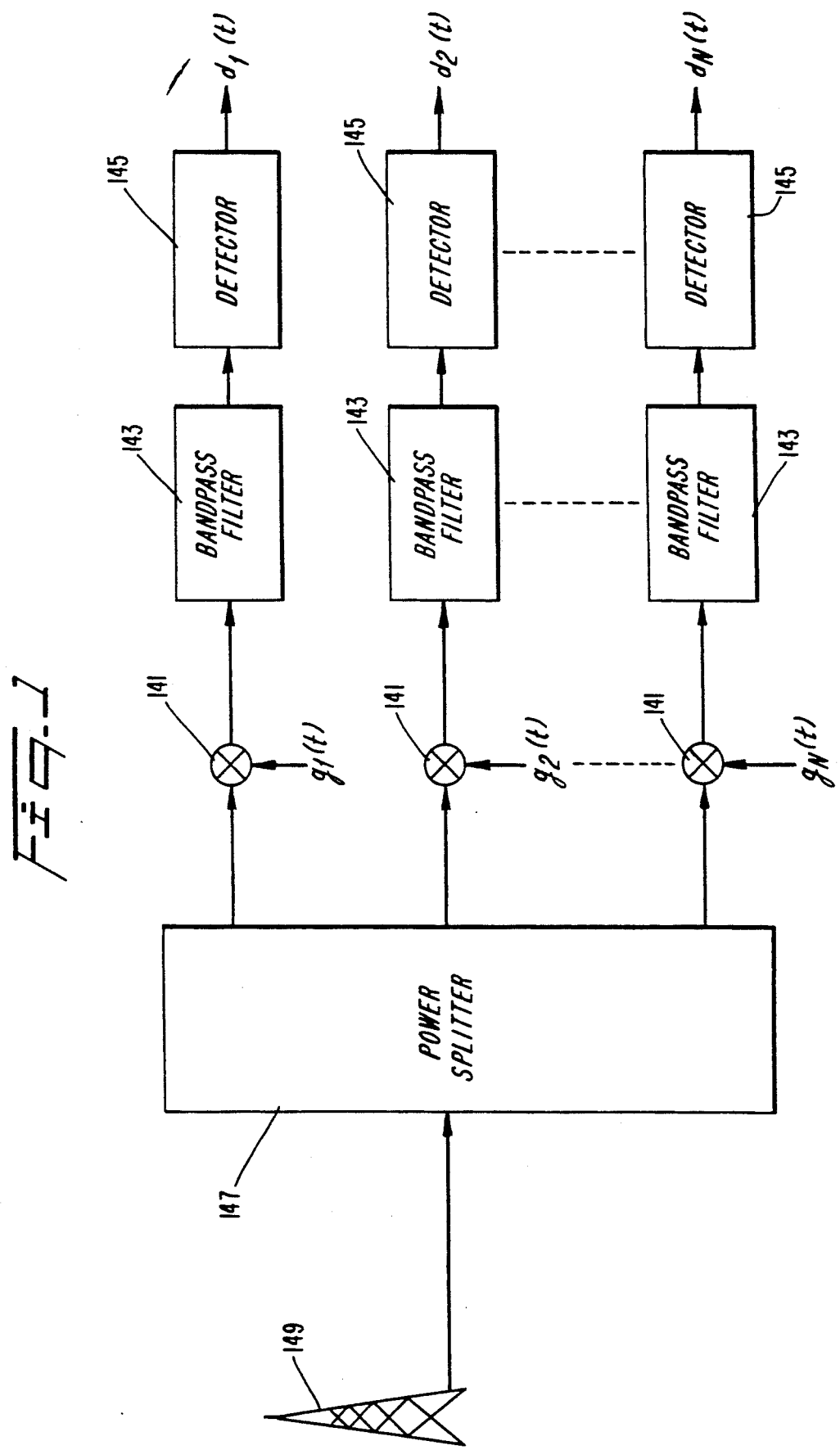

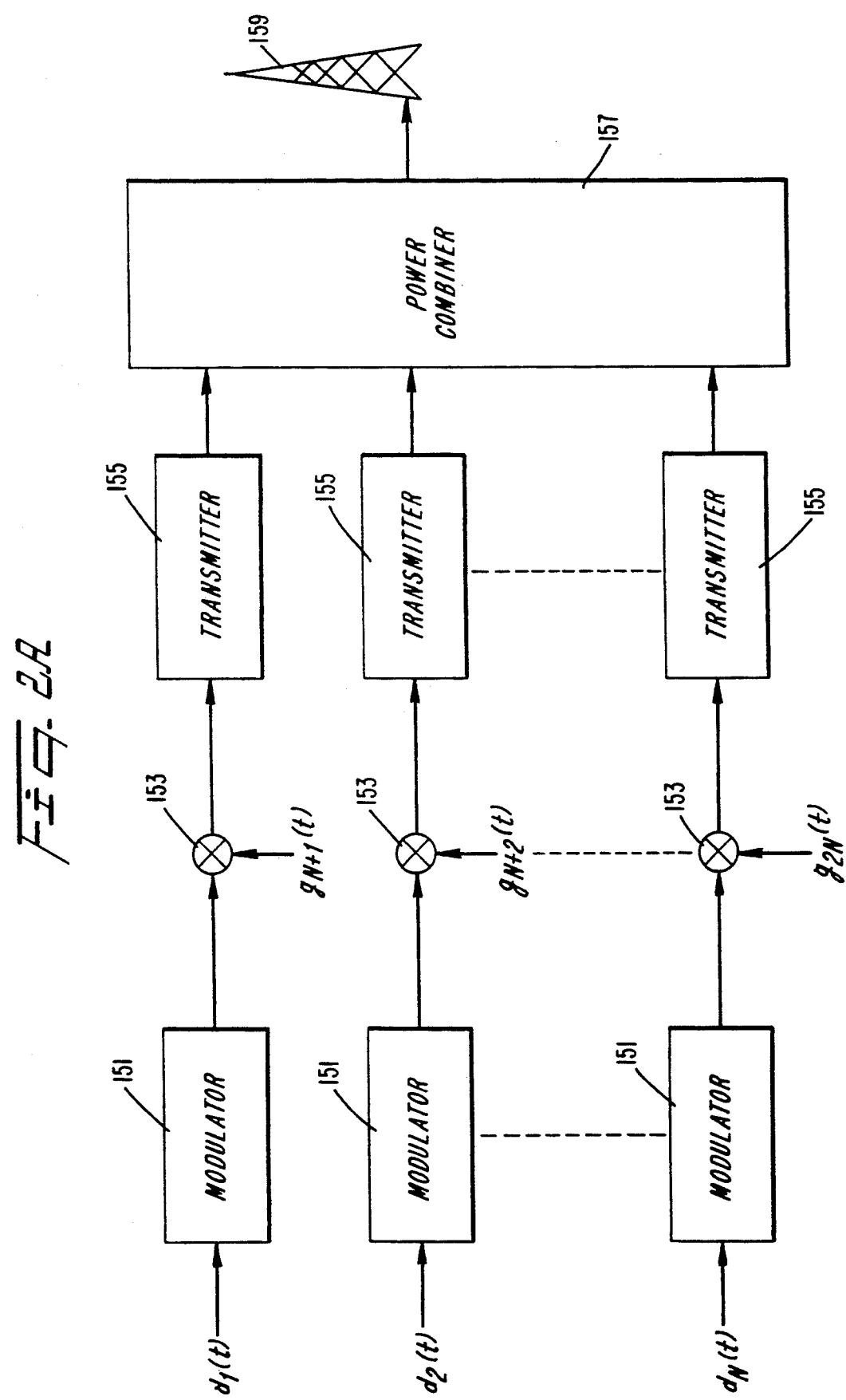

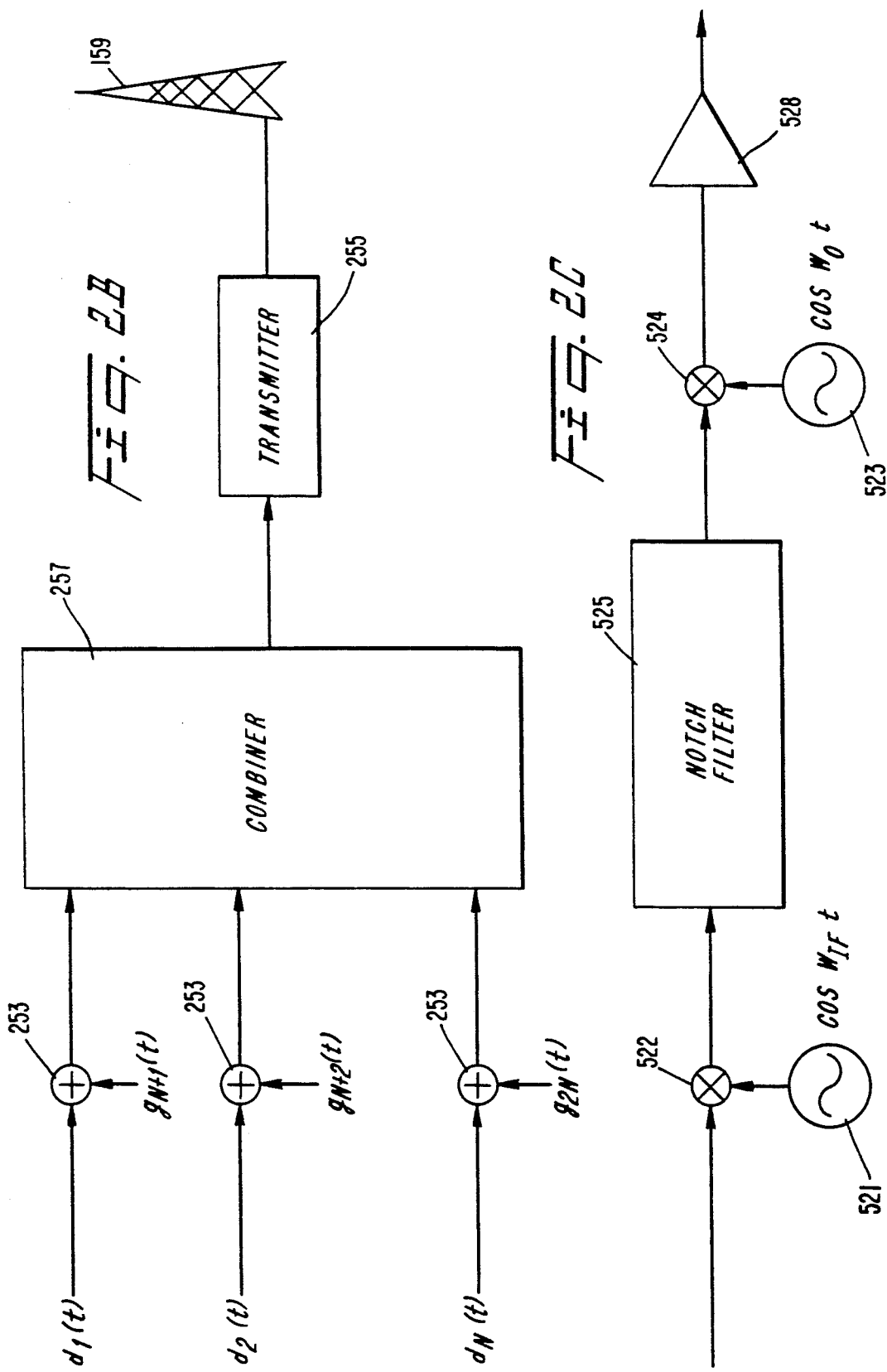

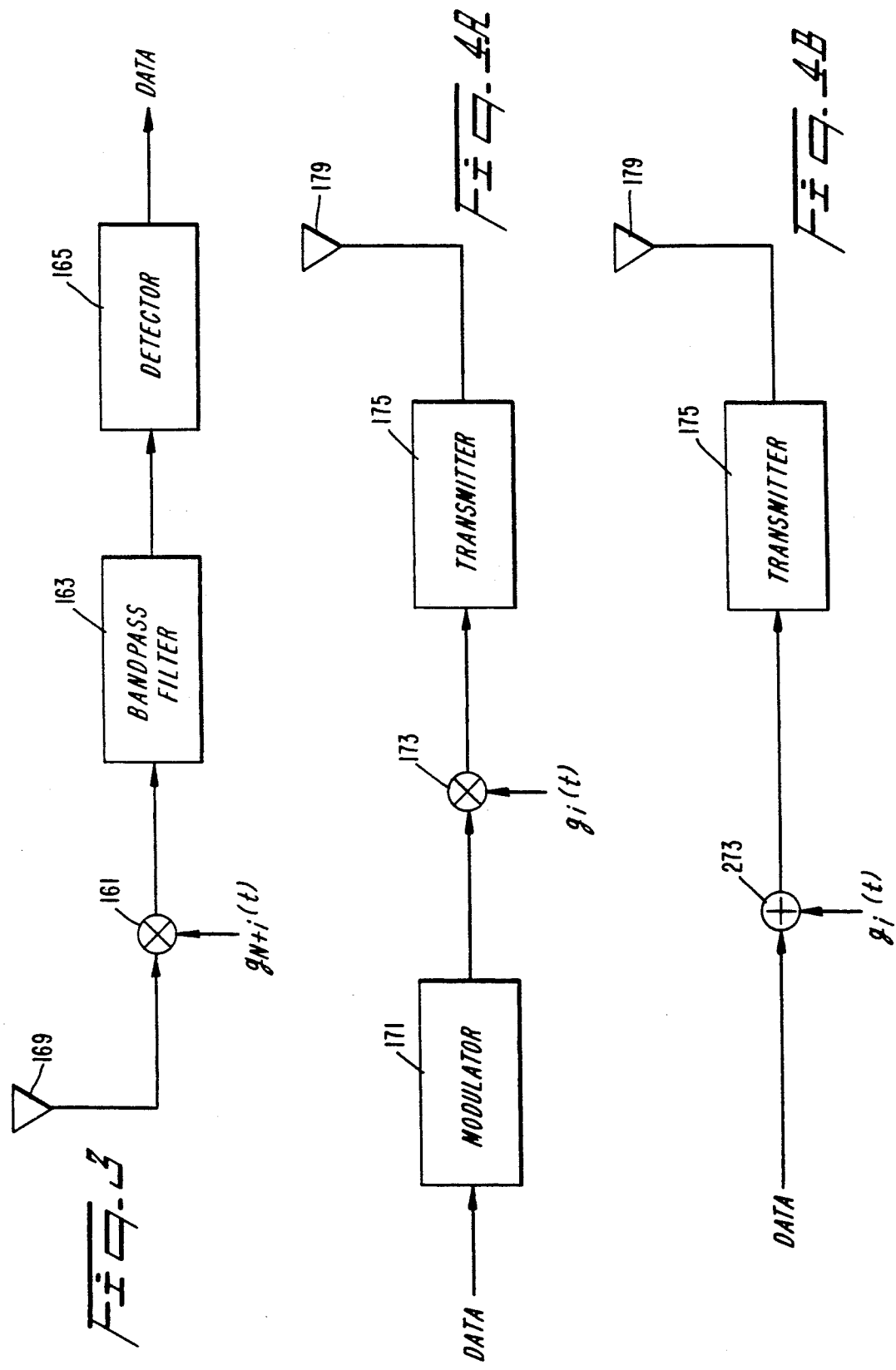

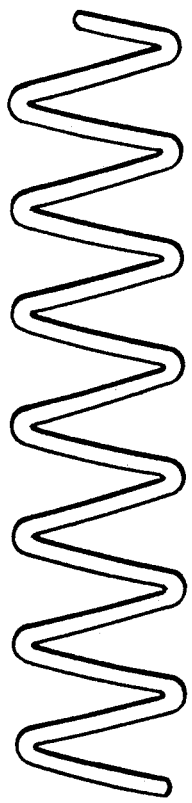
FIG. 9
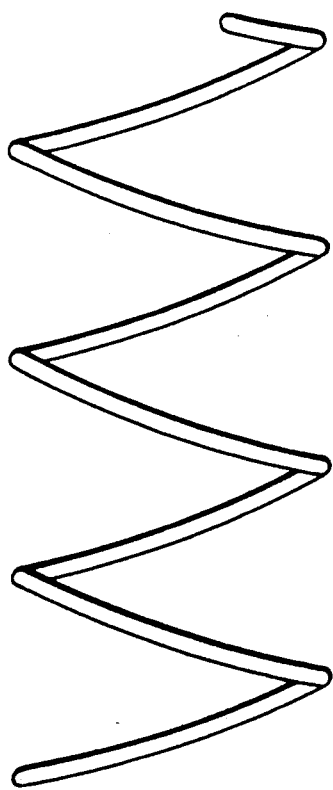
FIG. 6
FIG. 7

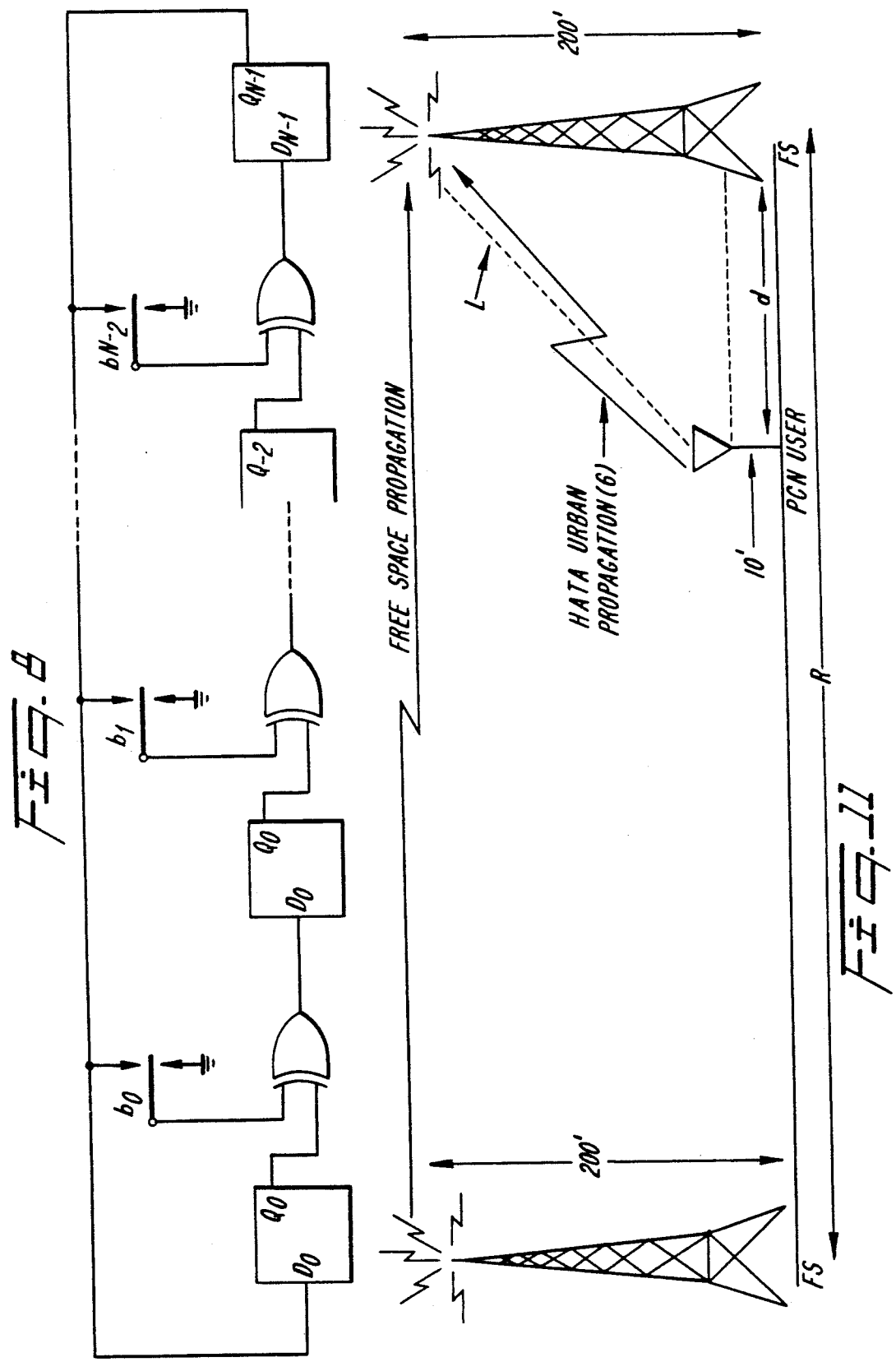

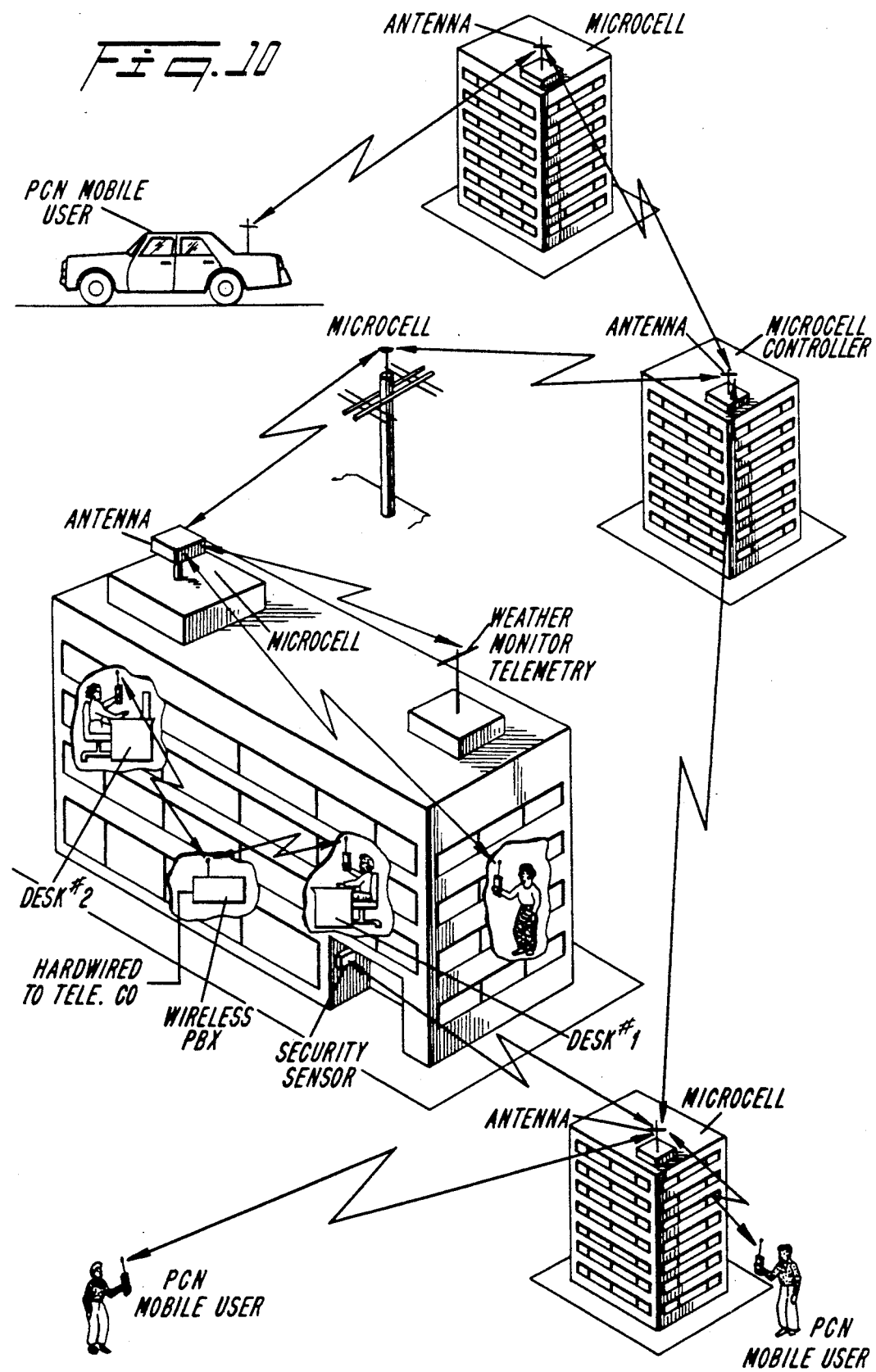

Fig. 13A

BANDWIDTH = 10 MHZ

| FIXED SERVICE LINK PARAMETERS | |
|---|---|
| MODULATION | 64-QAM |
| BIT RATE | 45 Mb/s |
| LINK LENGTH | 20 MILES |
| ANTENNA GAIN (2.AM GRID ANTENNA) | 30 dB |
| ANTENNA BANDWIDTH (3-dB POINT) | 3.2° |
| TRANSMIT POWER | 0.5 W (27 dBM) |
| ANTENNA CENTER LINE HEIGHTS | 200 FEET (BOTH ENDS) |

Fig. 13B

S.S. CHIP RATE = 25 Mcps

| PCM SYSTEM PARAMETERS | |
|---|---|
| MODULATION | SPREAD SPECTRUM |
| ANTENNA GAIN (HALF-WAVE DIPOLE) | 2 dB |
| TRANSMIT POWER | 1 mW (0 dBm) |

Fig. 14

| DISTANCE d | $P_S/P_I$ † 1 USER dB | $P_S/P_I$ * 10 USERS dB | $P_S/P_I$ * 100 USERS dB |
|---|---|---|---|
| 500 FT. | 64 | 54 | 44 |
| 1,000 FT. | 66.5 | 56.5 | 46.5 |
| 3,000 FT. | 70.3 | 60.3 | 50.3 |
| 1 MILE | 72.3 | 62.3 | 52.3 |

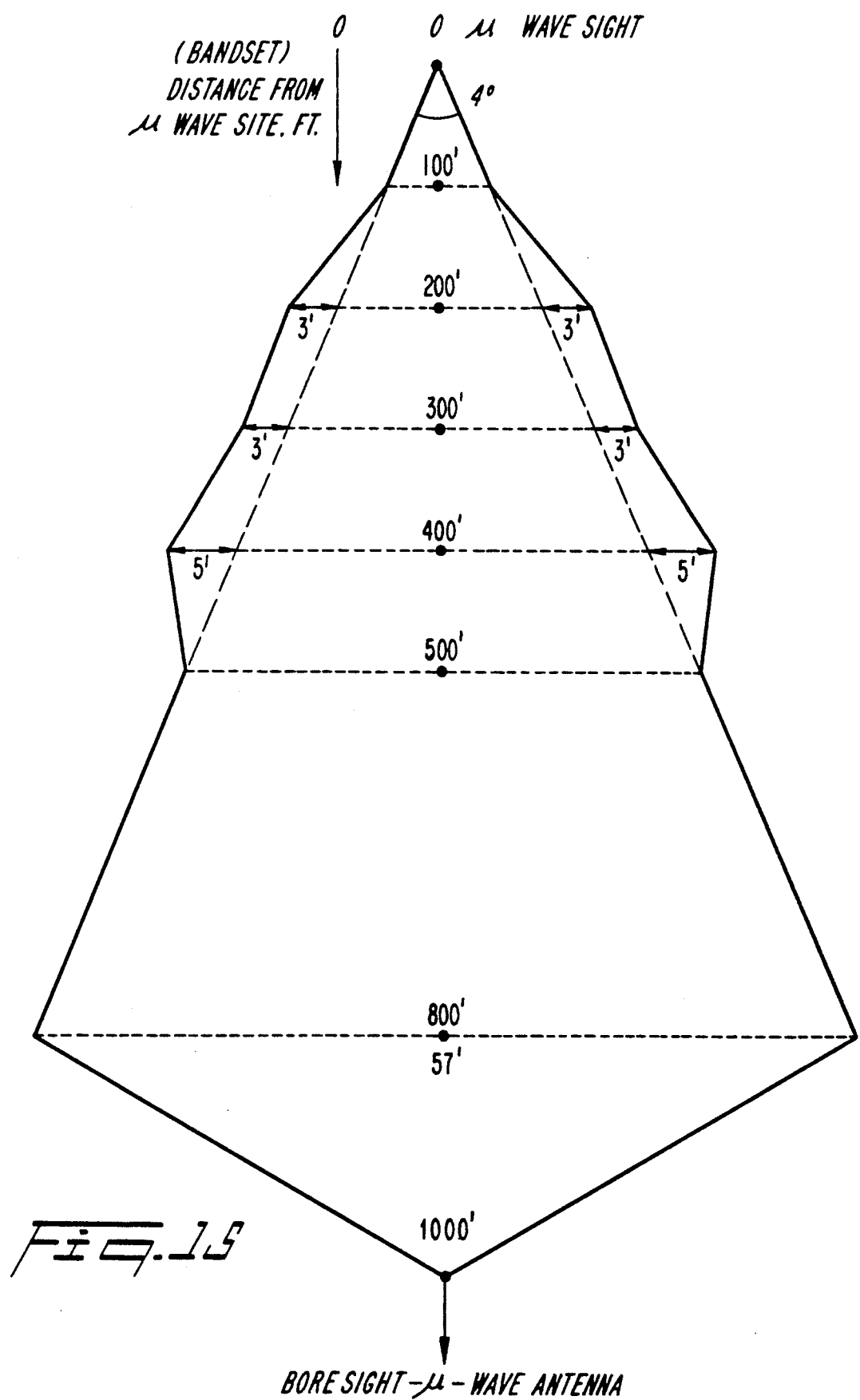

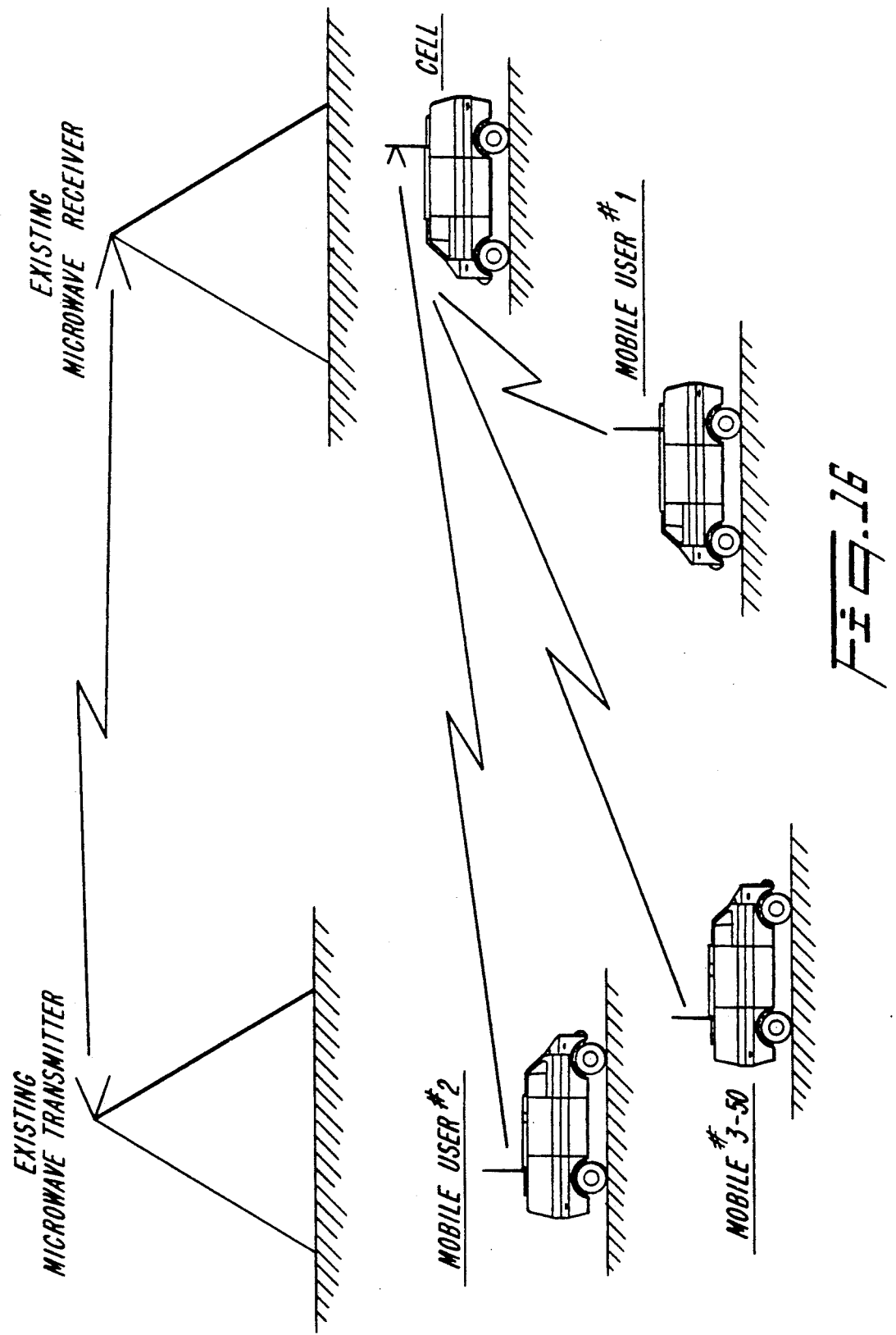

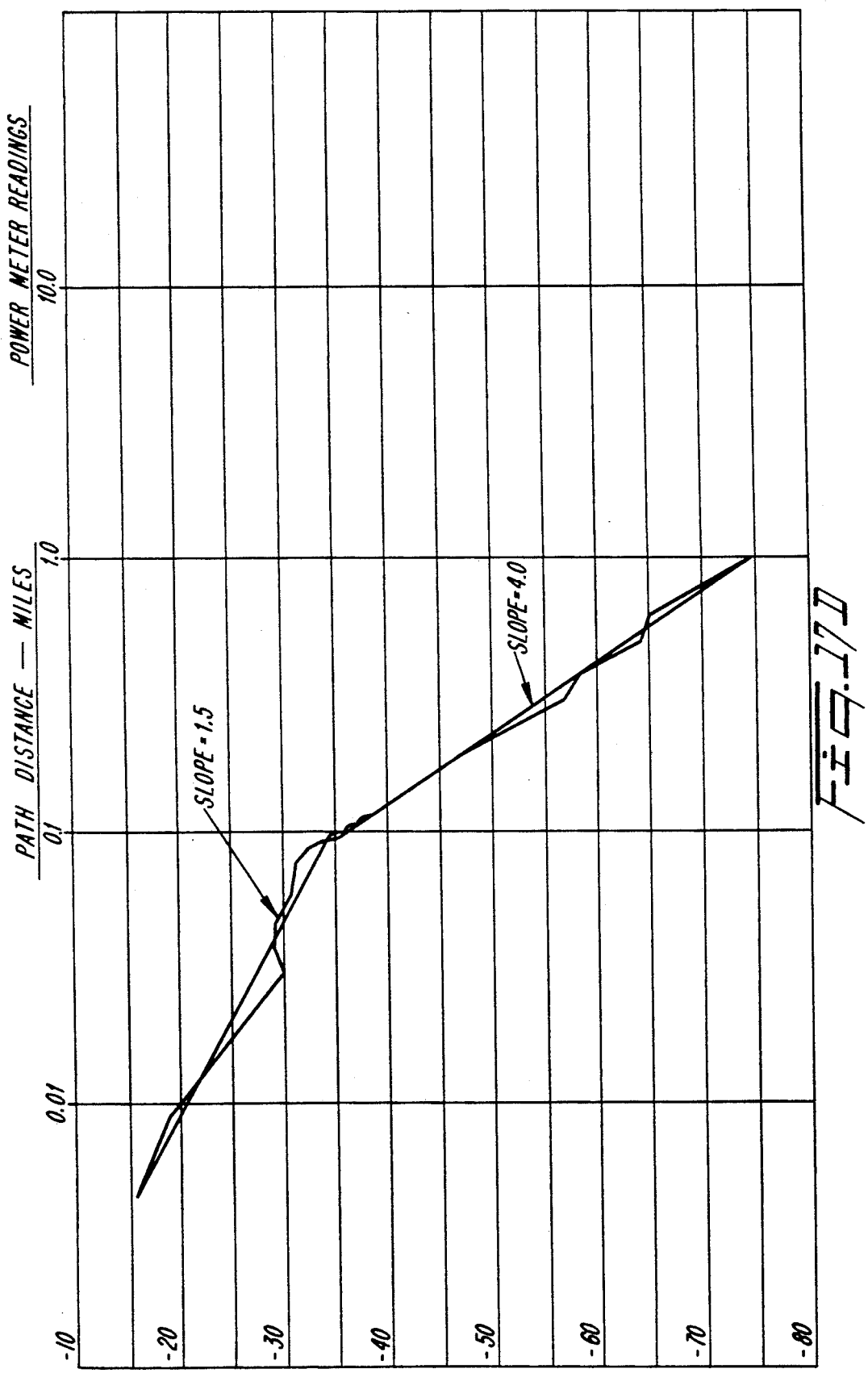

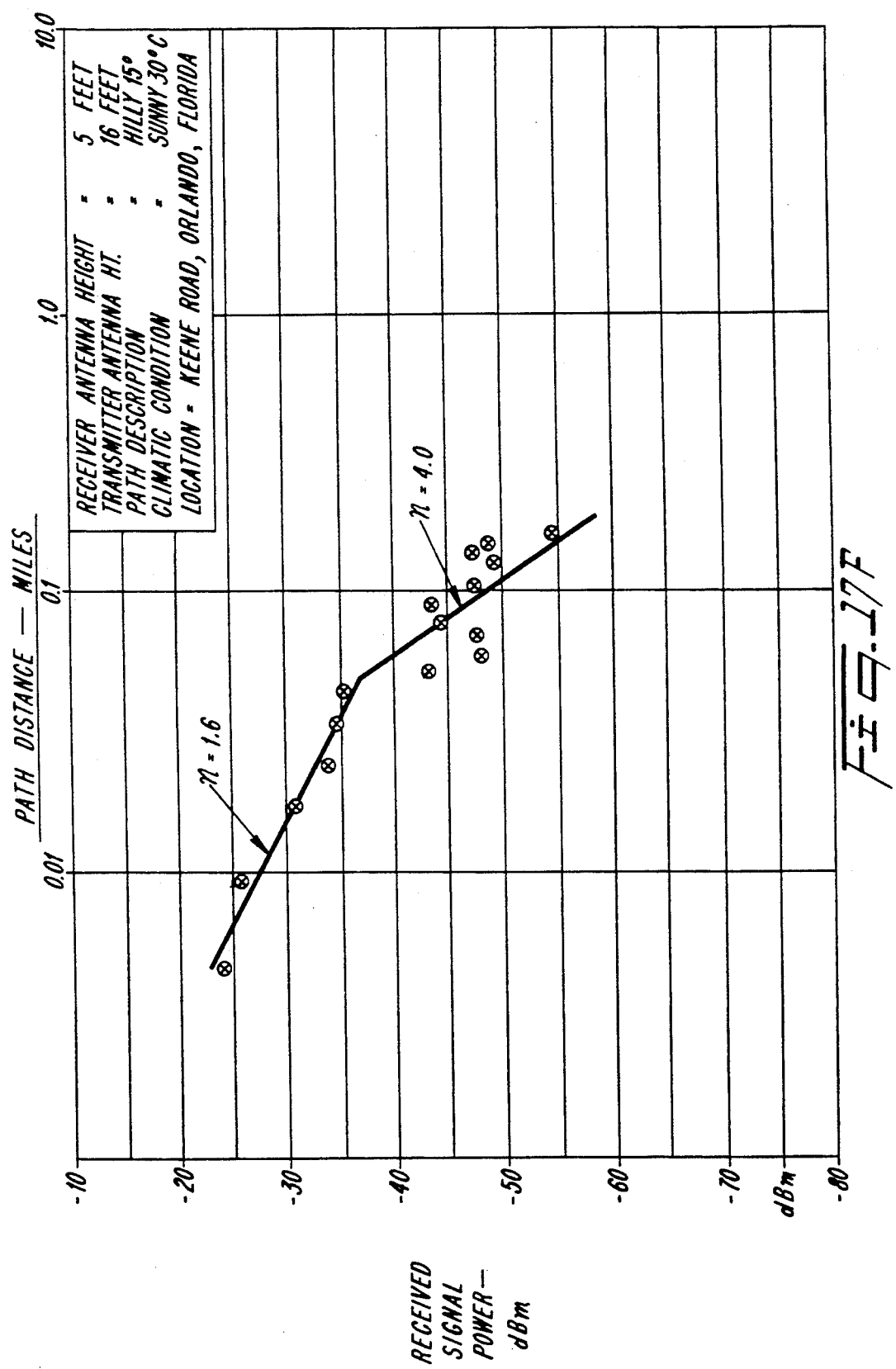

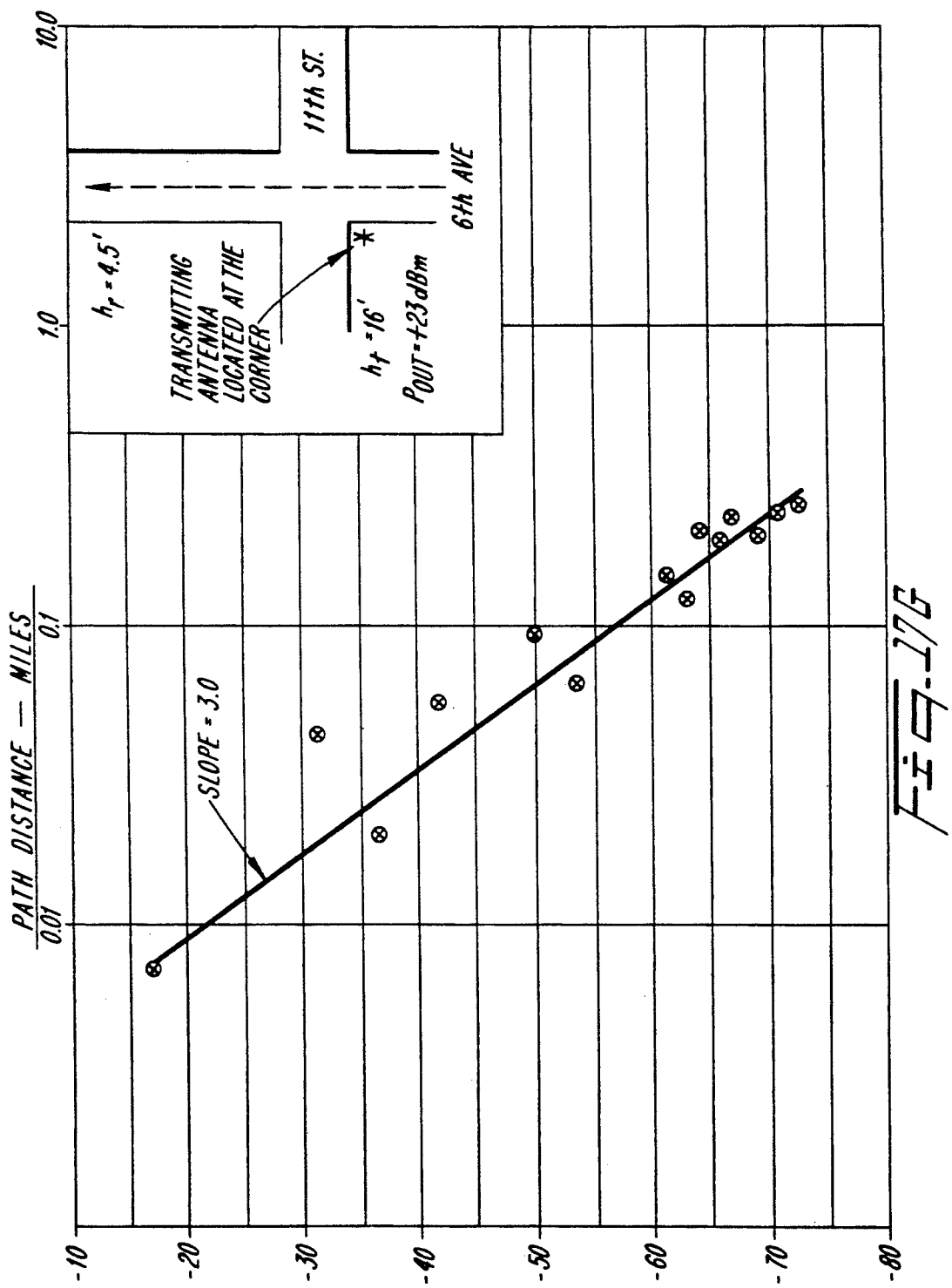

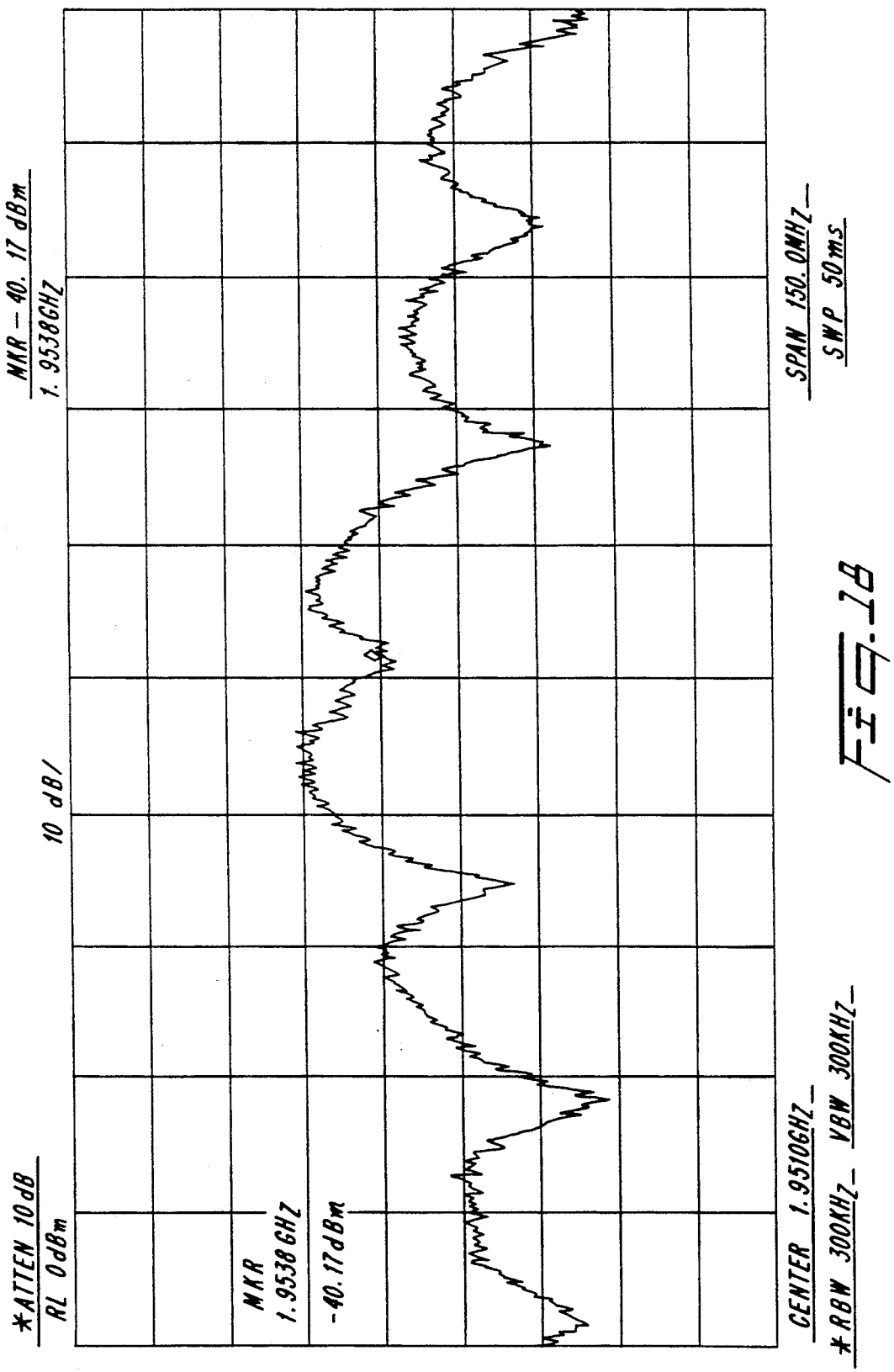

SPREAD SPECTRUM MICROWAVE OVERLAY WITH NOTCH FILTER

BACKGROUND OF THE INVENTION

This invention relates to spread spectrum communications and more particularly to a personal communications network which communicates over the same spectrum as used by a plurality of existing narrowband microwave users.

DESCRIPTION OF THE PRIOR ART

The current fixed service, microwave system uses the frequency band 1.85–1.99 GHz. Microwave users in this frequency band typically have a bandwidth of 10 MHz or less.

A problem in the prior art is the limited capacity of the channel, due to the number of channels available in the fixed service, microwave system.

OBJECTS OF THE INVENTION

An object of the invention is to provide a personal communications network (PCN) for increasing capacity for communications in a fixed service microwave system environment.

Another object of the invention is to provide a PCN system which can be used at the same frequencies as used by the fixed service, microwave systems.

An additional object of the invention is to provide a PCN system which can be used concurrently with a fixed service microwave system without interfering with the fixed service microwave system.

A further object of the invention is a PCN system which allows communications between a base station (cell) and PCN users with spread spectrum.

A still further object of the invention is a PCN system which can overlay geographically and overlay in spectrum, on an already existing fixed service, microwave system, without modifications to the fixed service, microwave system.

SUMMARY OF THE INVENTION

According to the present invention, as embodied and broadly described herein, a spread spectrum code division multiple access (CDMA) communications system for communicating data between a plurality of PCN users is provided comprising a plurality of PCN-base stations and a plurality of PCN user units. The PCN users communicate through the PCN-base station. Data may be, but are not limited to, computer data, facsimile data or digitized voice. In addition, such users might, in some applications, communicate directly to one another as in a point-to-point or local area network (LAN) configuration.

The spread spectrum CDMA communications system is located within a geographical region, cell, overlaying a fixed service, microwave system. The fixed service, microwave system transmitter and receiver, and the PCN-base station are not collocated. Each of the fixed service, microwave systems communicate over a fixed-service, microwave channel which has a fixed-service bandwidth. Typically, the fixed-service bandwidth is 10 MHz or less.

In the 1.85–1.99 GHz region, the spectrum is divided into a plurality of fixed-service, microwave channels. A first fixed-service microwave channel of a first microwave system is separated from a second fixed-service microwave channel of a second microwave system by a frequency guard band and/or geographical separation and/or spatial separation caused by narrow beam antennas.

A plurality of PCN-base stations overlay the same geographical region as occupied by the fixed service, microwave system. A PCN-base station communicates data between the plurality of PCN users. A PCN user uses a PCN unit, which may be embodied as a PCN handset.

Each PCN-base station has base-converting means, base-product-processing means, base-transmitting means, a base antenna, and base-detection means. Each base station optionally may have base-filter means. The base-converting means converts the format of the data to be transmitted to a PCN user into a form suitable for communicating over radio waves. The base-product-processing means processes the data with spread spectrum modulation. The base-filter means inserts one or more notches in the power spectrum transmitted from the base station. The notches are located at the same frequency as a fixed-service, microwave channel, and typically have approximately the same bandwidth as the fixed-service bandwidth. The base-transmitting means transmits, with a spread-spectrum bandwidth, from the PCN-base station to a PCN unit, the spread-spectrum-processed-converted data. The spread-spectrum bandwidth can overlay in frequency, one or more, fixed-service microwave channels, and is much greater than the bandwidth of a single fixed-service microwave channel.

The base-detection means is coupled to the base antenna. The base-detection means recovers data communicated from the PCN unit to the PCN-base station.

All the users lie in cells. However, some users are in a first cell and other users are in a second cell, etc. PCN units are located in cells. Each of the PCN units has a PCN antenna and PCN detection means. The PCN-detection means recovers data communicated from the PCN-base station. For communicating to the PCN-base station, the PCN unit has PCN-converting means, PCN-product-processing means, PCN-filter means and PCN-transmitting means. The PCN-converting means converts the format of data from a PCN user into a form suitable for communicating over radio waves. The PCN-product-processing means processes the data with spread spectrum modulation. The PCN-filter means inserts one or more notches in the power spectrum transmitted from the PCN unit at the same frequency as one or more fixed-service, microwave channels. The bandwidth of a notch filter typically is approximately the same as the fixed-service bandwidths. The PCN-transmitting means transmits with a spread-spectrum bandwidth, the spread spectrum processed converted data from the PCN unit to a PCN-base station. The spread-spectrum bandwidth from the PCN-transmitting means is the same as the base-transmitting means, and may partially or totally overlay the frequency spectrum of a microwave signal, or partially or totally overlay the spectrum of different microwave signals.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 is a block diagram of a PCN-base station receiver;

FIG. 2A is a block diagram of a first embodiment of a PCN-base station transmitter;

FIG. 2B is a block diagram of a second embodiment of a PCN-base station transmitter;

FIG. 2C is a detailed block diagram of a transmitter;

FIG. 3 is a block diagram of a PCN-unit receiver;

FIG. 4A is a block diagram of a first embodiment of PCN-unit transmitter;

FIG. 4B is a block diagram of a second embodiment of a PCN unit transmitter;

FIG. 6 shows a spread spectrum data signal when the spread spectrum signal power is equal to an AM signal power;

FIG. 7 shows an audio signal when the spread spectrum signal power is equal to the AM signal power;

FIG. 8 shows a possible pseudo-random sequence generator;

FIG. 9 shows possible position settings of switches of FIG. 8 to form PN sequences;

FIG. 10 illustrates a PCN system geographic architecture according to the present invention;

FIG. 11 shows fixed service microwave and PCN user geometry and urban propagation models;

FIGS. 13A and 13B shows link parameters for a typical 2 GHz fixed service link and a typical PCN system;

FIG. 14 illustrates calculated in-band received power at a fixed service microwave receiver in the presence of PCN users;

FIG. 15 depicts the region where a PCN handset has an error rate, $P_e > 10^{-2}$, due to fixed service microwave transmission and PCN versus handset cell range;

FIG. 16 shows a PCN field test experiment;

FIGS. 17A-17K show measured attenuation versus distance; and

FIG. 18 shows the spectrum of a spread spectrum signal with multipath.

DETAILED DESCRIPTION OF THE PREFERRED EMBODIMENTS

Figure 4C:
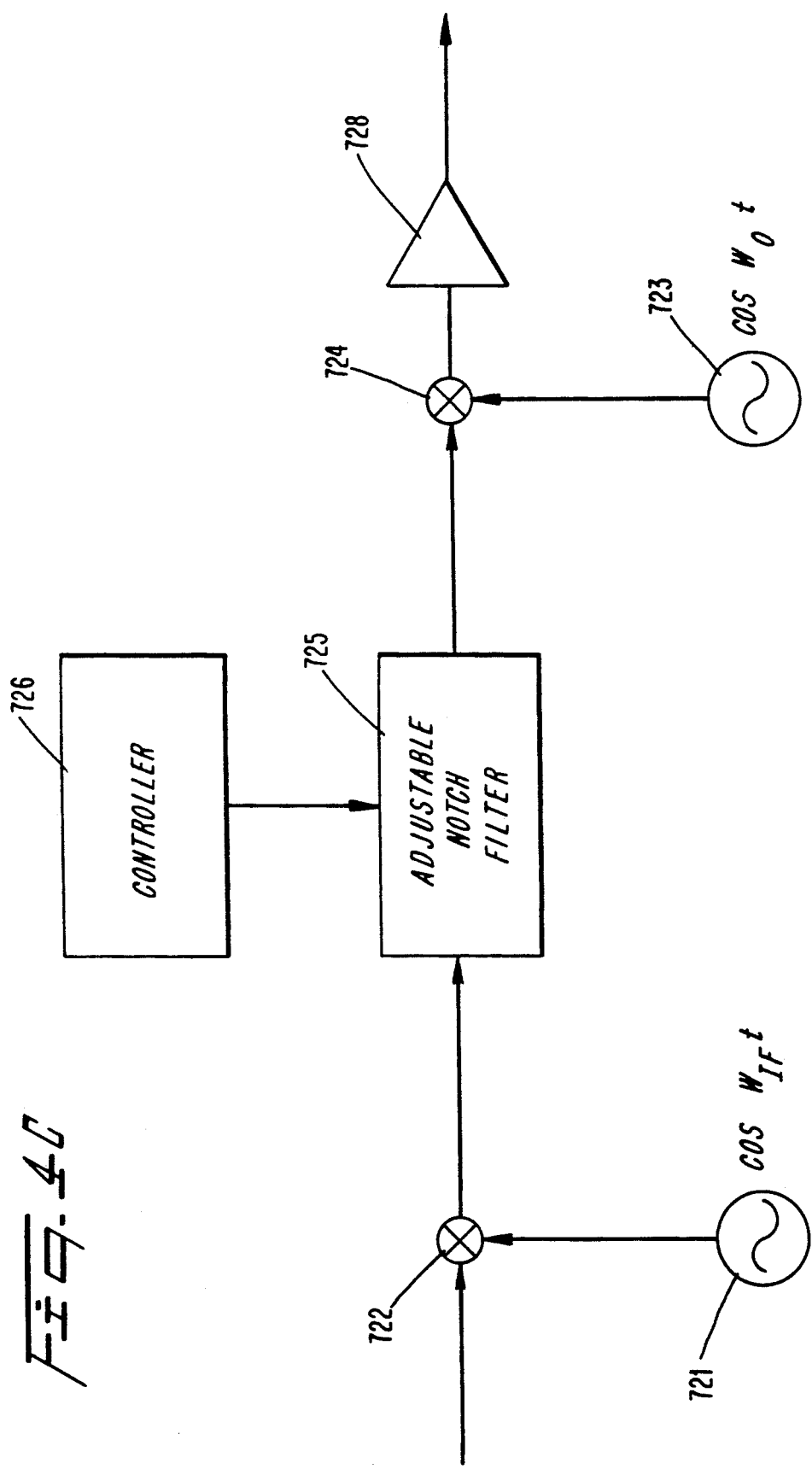
FIG. 4C is a detailed block diagram of a PCN transmitter.

Reference will now be made in detail to the present preferred embodiments of the invention, examples of which are illustrated in the accompanying drawings, wherein like reference numerals indicate like elements throughout the several views.

This patent is related to U.S. Pat. application having Ser. No. 07/622,235, filing date Dec. 5, 1990, entitled SPREAD SPECTRUM CDMA COMMUNICATIONS SYSTEM by Donald L. Schilling, and to U.S. Pat. application having Ser. No. 07/626,109, filing date Dec. 14, 1990, entitled SYNCHRONOUS SPREAD-SPECTRUM COMMUNICATIONS SYSTEM AND METHOD, which are both incorporated herein by reference.

The spread spectrum CDMA communications system of the present invention is located within a same geographical region as occupied by at least one fixed service, microwave system or other microwave system. Each fixed service microwave system communicates over a fixed-service microwave channel, which has a fixed-service bandwidth. In presently deployed fixed service microwave systems, the fixed-service bandwidth is 10 MHz or less.

In the 1.85-1.99 GHz region, the spectrum is used by a plurality of narrowband users, with each microwave user using one of a plurality of fixed-service-microwave channels. A first fixed-service microwave system using a first fixed-service microwave channel is separated in frequency by a guard band from a second fixed-service microwave system using a second fixed-service microwave channel. The first fixed-service microwave system may be separated geographically or spatially from the second fixed-service microwave system.

The spread spectrum CDMA communications system, which uses direct sequence (DS) spread spectrum modulation includes a plurality of PCN-base stations and a plurality of PCN units located within the same geographical region as occupied by the plurality of microwave users of the fixed service microwave system. The spread spectrum CDMA communications system can be used for communicating data between a plurality of PCN users. The data may be, but are not limited to, computer data, facsimile data or digitized voice.

A PCN-base station, which typically is not collocated geographically with a fixed service microwave station, communicates data between a plurality of PCN users. A first PCN user uses a first PCN unit, and a second PCN user uses a second PCN unit, etc.

Each PCN-base station includes base-converting means, base-product-processing means, base-transmitting means, base-detection means and a base antenna. Each base station optionally may have base-filter means. The base-detection means may include base-spread-spectrum-processing means and base-synchronizing means. The base-detection means broadly is a repeater which converts spread spectrum coded data communicated from one PCN unit into a form suitable for another PCN user or telecommunication user.

Each of the PCN-base stations may be geographically spaced such that the power radiated by the base-transmitting means from within its cell up to a contiguous cell of a neighboring PCN-base station primarily varies inversely with distance by an exponent of approximately two, and the power radiated by the base-transmitting means outside its cell primarily varies inversely with distance by an exponent which is greater than two, typically four or more.

The geographic spacing of cells typically is small, on the order of 1200 to 2000 feet. The small spacing allows the use of low transmitter power, so as not to cause interference with the fixed-service microwave systems. Also, an in-band fixed service microwave user is often spatially and geographically distant from the PCN system, and when this occurs it results in negligible interference with the fixed-service microwave user. As set forth below, base-filter means inserts notches in the power spectrum transmitted from the base-transmitting means, which essentially eliminates all interference from the base station to a fixed-service microwave system.

The base-spread-spectrum-processing means, as illustrated in FIG. 1, may be embodied as a pseudorandom generator, a plurality of product devices 141 and a plurality of bandpass filters 143. The pseudorandom generator stores chip codes, $g_1(t), g_2(t), \ldots, g_N(t)$, for demodulating data from spread spectrum signals received from the plurality of PCN units at the PCN-base station. The base-detection means also includes means for synchronizing the base-spread-spectrum-processing means to received spread spectrum signals.

The base-spread-spectrum-processing means at the PCN-base station processes selected data received from a selected PCN unit, which were transmitted with a spread spectrum signal using a selected-chip code, $g_i(t)$. The detector 145 demodulates the selected data from the despread spread-spectrum signal.

A plurality of product devices 141, bandpass filters 143 and detectors 145 may be coupled through a power splitter 147 to an antenna 149, for receiving simultaneously multiple spread-spectrum channels. Each product device 141 would use a selected chip code for demodulating a selected spread spectrum signal, respectively.

For a spread spectrum system to operate properly, the spread spectrum receiver must acquire the correct phase position of the received spread spectrum signal, and the receiver must continually track that phase position so that loss-of-lock will not occur. The two processes of acquisition and tracking form the synchronization subsystem of a spread spectrum receiver. The former operation is typically accomplished by a search of as many phase positions as necessary until one is found which results in a large correlation between the phase of the incoming signal and the phase of the locally generated spreading sequence at the receiver. This former process occurs using correlator means or matched filter means. The latter tracking operation is often performed with a "delay-locked loop". The importance of the combined synchronization process cannot be overstated for if synchronization is not both achieved and maintained, the desired signal cannot be despread.

The base-converting means, as illustrated in FIG. 2A, may be embodied as a plurality of base modulators 151. A base modulator 151 converts the format of data to be transmitted to a PCN user into a form suitable for communicating over radio waves. For example, an analog voice signal may be converted to a base-data signal, using a technique called source encoding. Typical source coders are linear predictive coders, vocoders, delta modulators and pulse code modulation coders.

The base-product-processing means may be embodied as a plurality of base-spread-spectrum modulators 153. A base-spread-spectrum modulator 153 is coupled to a base modulator 151. The base-spread-spectrum modulator 153 modulates the converted-data signal using spread spectrum. The converted data is multiplied using a product device or modulo-2 added, using an EXCLUSIVE-OR gate 153 with a selected spread-spectrum chip code, $g_{N+i}(t)$, as shown in FIG. 2B. The spread-spectrum bandwidth of the converted data is much greater than, at least approximately two times, the narrowband bandwidth of a fixed service microwave user. The spread-spectrum bandwidth typically overlays in spectrum one or more fixed-service channels. In a preferred embodiment, the spread-spectrum bandwidth is 48 MHz.

The base-transmitting means may be embodied as a plurality of base transmitters 155. A base transmitter 155 is coupled to a base-spread-spectrum modulator 153. The base transmitter 155 transmits across the fixed service microwave bandwidth, the spread-spectrum-processed-converted data from the PCN-base station to a PCN unit. The base transmitter 155 includes modulating the spread spectrum processed converted data at a carrier frequency, $f_o$.

The base-transmitter 155 has a transmitter oscillator which supplies a carrier signal at the carrier frequency. The transmitter oscillator is coupled to a transmitter product device. The transmitter multiplies, using the transmitter-product device, the spread-spectrum-processed-converted data by the carrier signal. A more detailed description of transmitter 155 is provided in FIG. 2C.

The base-transmitting means may, in a preferred embodiment, transmit data using a spread spectrum signal having a power level limited to a predetermined level. The base-transmitting means may transmit data by adding the plurality of spread spectrum data signals.

A plurality of modulators 151, product devices 153 and transmitters 155 may be coupled through a power combiner 157 to an antenna 159 for simultaneously transmitting a multiplicity of spread-spectrum channels. FIG. 2A is an illustrative embodiment for generating simultaneous spread spectrum signals, and there are many variants for interconnecting product devices, modulators and transmitters, for accomplishing the same function.

As an alternative example, FIG. 2B illustrates a PCN-base station transmitter which may be used for producing the same result as the transmitter of FIG. 2A. In FIG. 2B data are modulo-2 added, using EXCLUSIVE-OR gates 253 with a selected spread-spectrum chip code, $g_{N+i}(t)$. The resulting spread-spectrum-processed data from a plurality of EXCLUSIVE-OR gates 253 are combined using combiner 257. The base transmitter 255 modulates the combined spread-spectrum-processed data at the carrier frequency, $f_o$. The transmitter 255 is coupled to the antenna 159 and simultaneously transmits the plurality of spread-spectrum-processed data as a multiplicity of spread-spectrum channels.

FIG. 2C illustratively shows the base-filter means embodied as a notch filter 525, as part of a PCN-base transmitter. The embodiment shown in FIG. 2C may be employed in the base transmitters 155, 255 of FIGS. 2A and 2B. The notch filter 525 inserts one or more notches in the power spectrum transmitted from the base-transmitting means. The notches are located at the same frequency as a fixed-service, microwave channel, and typically have the same bandwidth, a fixed-service bandwidth, as the fixed-service microwave channel. Preferably, the notches provide 15 dB or more attenuation.

The notch filter 525 can be implemented at an intermediate frequency of the transmitter, or with technology permitting, the notch filter could operate at the carrier frequency, $f_o$. The notch filter 525 is shown as an example, in FIG. 2C, coupled between a first transmitter mixer 522 and a second transmitter mixer 524. The first transmitter mixer 522 is coupled to a first local oscillator 521, and the second transmitter mixer 524 is coupled to a second local oscillator 523. A transmitter typically has a power amplifier 528 coupled to an output of the second local oscillator 523.

In FIG. 2C, the first local oscillator 521 supplies a signal to the first transmitter mixer 522 for modulating the combined spread-spectrum-processed data from combiner 257. The second local oscillator 523 supplies a signal to the transmitter mixer 524 for modulating the notched combined spread-spectrum-processed data, outputted from the notch filter 525, to the carrier frequency.

Assume that the bandwidth of the combined spread-spectrum-processed data is much greater than that of fixed-service microwave user's bandwidth. The notch filter 525 can insert notches in the spectrum of the combined spread-spectrum-processed data such that when the combined spread-spectrum-processed data are modulated and transmitted at the carrier frequency, $f_o$, the notches coincide with the fixed-service, microwave channels.

Typically, a PCN-base station and the fixed-service microwave station have fixed geographic locations, and the fixed-service microwave channel is at a preassigned frequency and bandwidth. Thus, a notch filter for a PCN-base station can be a fixed design. The notch filter at a PCN-base station alternatively may be an adjustable notch filter. The adjustable notch filter can be responsive to a dynamic environment, where microwave signals or channels appear unexpectedly.

The notch in the spectrum of the transmitted spread-spectrum signals from the PCN-base station is less than the bandwidth of the spectrum. For example, the transmitted spread-spectrum signals from a PCN-base station might have a bandwidth of 48 MHz. The fixed-service, microwave channel might have a fixed-service bandwidth of less than 10 MHz. Thus, in this example, a notch filter would reduce the energy in the transmitted spread-spectrum signal from the PCN-base station by approximately only 20% or less.

The present invention also includes PCN units which are located within the cell. Each of the PCN units has a PCN antenna, PCN-detection means, PCN-converting means, PCN-product-processing means, PCN-filter means and PCN-transmitting means. The PCN-detection means is coupled to the PCN-antenna. The PCN-detection means includes PCN-spread-spectrum-processing means.

The PCN-detection means recovers data communicated to the PCN unit from the PCN-base station. The detection means also includes means for converting the format of the data for output to a user. The format may be, for example, computer data, an analog speech signal or other information. The PCN-detection means, by way of example, may include tracking and acquisition circuits for the spread spectrum signal, a product device for despreading the spread spectrum signal and an envelope detector. FIG. 3 illustratively shows an antenna 169 coupled to PCN detection means, which is embodied as a PCN spread-spectrum demodulator 161, PCN-bandpass filter 163, and PCN-data detector 165.

The PCN-spread-spectrum demodulator 161 despreads, using a chip-code signal having the same or selected chip code, $g_{N+i}(t)$, as the received spread-spectrum signal, the spread-spectrum signal received from the PCN-base station. The bandpass filter 163 filters the despread signal and the PCN-data detector 165 converts the format of the despread spread-spectrum signal for output to a PCN user.

The PCN-spread-spectrum-processing means includes means for storing a local chip code, $g_{N+i}(t)$, for comparing to signals received for recovering data sent from the PCN-base station to the PCN unit.

The PCN-spread-spectrum-processing means also may include means for synchronizing the PCN-spread-spectrum-processing means to received signals. Similarly, the PCN-spread-spectrum-processing means at the PCN-base station includes means for processing data for particular PCN units with a selected chip code.

The PCN-converting means, as illustrated in FIG. 4A, may be embodied as a PCN modulator 171. The PCN modulator 171 converts the format of the data into a form suitable for communicating over radio waves. Similar to the PCN-base station, an analog voice signal may be converted to a converted-data signal, using a technique called source encoding. As with the base modulator 151, typical source encoders are linear predictive coders, vocoders, adaptive delta modulators and pulse code modulators.

The PCN-product-processing means may be embodied as a PCN-spread-spectrum modulator 173. The PCN-spread-spectrum modulator 173 is coupled to the PCN modulator 171. The PCN-spread-spectrum modulator 173 modulates the converted-data signal with a selected chip code, $g_i(t)$. The converted-data signal is multiplied using a product device with the selected chip code, $g_i(t)$. The spread-spectrum bandwidth of the converted data is much greater than, approximately five times greater in the preferred embodiment, the narrowband bandwidth of a fixed service microwave user. In a preferred embodiment, the spread-spectrum bandwidth is 48 MHz. The spread-spectrum bandwidth from the PCN modulator 171 is the same as that from the modulator 151 at the PCN-base station, and may overlay the same microwave frequency or overlay separate microwave frequencies.

As an equivalent transmitter, FIG. 4B illustrates a transmitter for a PCN unit having PCN-spread-spectrum-processing means as a PCN modulo-2 adder, embodied as an EXCLUSIVE-OR gate 273. The EXCLUSIVE-OR gate 273 modulo-2 adds the converted data signal with the selected chip code, $g_i(t)$.

The PCN-transmitting means in FIGS. 4A and 4B may be embodied as a PCN transmitter 175. The PCN transmitter 175 is coupled between the PCN-spread-spectrum modulator 173 and antenna 179. The PCN transmitter 175 transmits across the fixed-service microwave bandwidth, the spread-spectrum-processed-converted data from the PCN unit to the PCN-base station. The PCN transmitter 175 modulates the spread-spectrum-processed-converted data at a carrier frequency, $f_o$. The carrier frequency of the PCN transmitter and the cell transmitter may be at the same or at different frequencies. Typically the PCN transmitter and the cell transmitter use the same frequency if half duplex is used, and two frequencies if full duplex is used.

The PCN-filter means inserts one or more notches in the power spectrum transmitted from the PCN-transmitting means. The notches are located at the same frequency as a fixed-service, microwave channel, and typically have the same bandwidth as a fixed-service microwave channel. Preferably, the notches provide 15 dB or more attenuation.

FIG. 4C illustrates the PCN-filter means embodied preferably as an adjustable-notch filter 725 as part of a PCN transmitter. The embodiment shown in FIG. 4C may be employed in the PCN transmitter 175 of either FIG. 4A or FIG. 4B. The adjustable notch filter 725 is shown implemented at an intermediate frequency of the PCN transmitter 175, although with technology permitting, the adjustable notch filter 725 can be at the carrier frequency, $f_o$, of the PCN transmitter 175.

The adjustable-notch filter 725 is coupled between a first PCN-transmitter mixer 722 and a second PCN-transmitter mixer 724. The first PCN-transmitter mixer 722 is coupled to a first PCN-local oscillator 721, and the second PCN-transmitter mixer 724 is coupled to a second PCN-local oscillator 723. A transmitter typically has a power amplifier 728 coupled to an output of the second local oscillator 723.

In FIG. 4C the first PCN-local oscillator 721 provides a first oscillator frequency signal to the first PCN-transmitter mixer 722. The first PCN-transmitter mixer 722 modulates the spread-spectrum-processed data to the PCN-transmitter intermediate frequency, $f_{IF}$. The second PCN-local oscillator 723 provides a second oscillator signal to the second PCN-transmitter mixer 724. The second PCN-transmitter mixer 724 modulates the notched spread-spectrum-processed data to a carrier frequency, $f_o$.

Assume that the bandwidth of the spread-spectrum-processed data is much greater that of the fixed-service bandwidth. The adjustable-notch filter 725 can insert notches in the spectrum of the spread-spectrum-processed data such that when the spread-spectrum-processed data are modulated and transmitted at the carrier frequency, $f_o$, the notches coincide with the fixed-service microwave channels.

A PCN unit is assumed to roam within a geographic region of one or more cells. Thus, the PCN unit, at different locations, may tend to interfere with fixed-service, microwave channels at different frequencies The adjustable-notch filter 725 has its center frequency and bandwidth set so as to notch the power spectrum from the PCN transmitter at whatever desired frequency and bandwidth of the fixed-service, microwave channel.

The adjustable-notch filter 725 can be controlled several ways. First, each PCN-base station can be programmed with the frequency and bandwidth of each fixed-service microwave user which transmits across the geographic region of the base station. The PCN-base station can send a command signal to the PCN unit through one of the spread-spectrum channels, indicating which portions of spectrum to notch out with the adjustable-notch filter 725. A controller 726, which receives the command signal, can set the adjustable-notch filter 725 to one or more center frequencies and bandwidths. Note that this scenario assumes that the base station has knowledge of the location in frequency and bandwidths of the fixed-service, microwave channels operating within the same geographic region of the cell.

Second, the PCN unit, or the PCN-base station, alternatively or in addition, may have a sensor which detects the microwave power or energy of the one or more fixed-service, microwave channels. The sensor determines the center frequency and the bandwidth of the fixed-service microwave channel, and then the controller 726 adjusts the adjustable-notch filter 725 to notch the spread-spectrum-processed data at those frequencies and bandwidths.

In a preferred embodiment the adjustable-notch filer 726 may be embodied as an adaptive transversal filter. Any tunable notch filter, however, can be used for the adjustable-notch filter 726. A single-tuned, resistor-inductor-capactor, RLC, circuit has been found to suffice for many applications. The circuit may be tuned with a variable capacator, i.e., a varicap controlled by a voltage.

The spread spectrum signals of the present invention are designed to be "transparent" to other users, i.e., spread spectrum signals are designed to provide "negligible" interference to the communication of other, existing users. The presence of a spread spectrum signal is difficult to determine. This characteristic is known as low probability of interception (LPI) and low probability of detection (LPD). The LPI and LPD features of spread spectrum allow transmission between users of a spread spectrum CDMA communications system without the existing users of the mobile cellular system experiencing significant interference. The present invention makes use of LPI and LPD with respect to the predetermined channels in the fixed-service microwave system. By having the power level of each spread spectrum signal below the predetermined level, then the total power from all spread spectrum users within a cell does not interfere with microwave users in the fixed-service microwave system.

The PCN units and optionally the base stations can have a notch filter in their respective transmitters for reducing the power transmitted from the PCN unit and base station at the frequency and fixed-service bandwidth of the fixed-service microwave system. Accordingly, the PCN system, as disclosed herein, can overlay an already existing fixed-service microwave system without causing any interference to the fixed-service microwave system. The effect on the PCN system of notching a portion of the bandwidth of the spread spectrum signal is minimal inasmuch as the notch removes only a small portion of the total power in the spectrum of the spread spectrum signal. It has been found experimentally that the use of such filters does not noticeably affect the acquisition time or the tracking capability of the system. Indeed, no deleterious affects were observed.

Spread spectrum is also "jam" or interference resistant. A spread spectrum receiver spreads the spectrum of the interfering signal. This reduces the interference from the interfering signal so that it does not noticeably degrade performance of the spread spectrum system. This feature of interference reduction makes spread spectrum useful for commercial communications, i.e., the spread spectrum waveforms can be overlaid on top of existing narrowband signals. Accordingly, signals from an already existing fixed-service microwave system cause negligible degradation in performance of the spread-spectrum system.

The present invention employs direct sequence spread spectrum, which uses a phase (amplitude) modulation technique. Direct sequence spread spectrum takes the power that is to be transmitted and spreads it over a very wide bandwidth so that the power per unit bandwidth (watts/hertz) is minimized. When this is accomplished, the transmitted spread spectrum power received by a microwave user, having a relatively narrow bandwidth, is only a small fraction of the actual transmitted power.

In a fixed-service microwave system, by way of example, if a spread spectrum signal having a power of 1 milliwatt is spread over a fixed-service microwave bandwidth of 48 MHz and a microwave user employs a communication system having a channel bandwidth of only 10 MHz, then the effective interfering power due to one spread spectrum signal, in the narrow band communication system, is reduced by the factor of 48

MHz/10 MHz which is approximately 5. Thus, the effective interfering power is 1 milliwatt (mW) divided by 5 or 0.2 mW. For fifty concurrent users of spread spectrum, the power of the interfering signal due to spread spectrum is increased by fifty to a peak interfering power of 10 mW.

The feature of spread spectrum that results in interference reduction is that the spread spectrum receiver actually spreads the received energy of any interferer over the same wide bandwidth, 50 MHz in the present example, while compressing the bandwidth of the desired received signal to its original bandwidth. For example, if the original bandwidth of the desired PCN data signal is only 30 kHz, then the power of the interfering signal produced by the cellular base station is reduced by 50 MHz/30 kHz which is approximately 1600.

Direct sequence spread spectrum achieves a spreading of the spectrum by modulating the original signal with a very wideband signal relative to the data bandwidth. This wideband signal is chosen to have two possible amplitudes, +1 and −1, and these amplitudes are switched, in a "pseudo-random" manner, periodically. Thus, at each equally spaced time interval, a decision is made as to whether the wideband modulating signal should be +1 or −1. If a coin were tossed to make such a decision, the resulting sequence would be truly random. However, in such a case, the receiver would not know the sequence a-priori and could not properly receive the transmission. Instead a chip-code generator generates electronically an approximately random sequence, called a pseudo-random sequence, which is known a-priori to the transmitter and receiver.

To illustrate the characteristics of spread spectrum, consider 4800 bps data which are binary phase-shift keyed (BPSK) modulated. The resulting signal bandwidth is approximately 9.6 kHz. This bandwidth is then spread using direct sequence spread spectrum to 16 MHz. Thus, the processing gain, N, is approximately 1600 or 32 dB.

Alternatively, consider a more typical implementation with 4800 bps data which is modulo-2 added to a spread-spectrum-chip-code signal, $g_i(t)$, having a chip rate of 25 Mchips/sec. The resulting spread-spectrum data are binary-phase-shift keyed (BPSK) modulated. The resulting spread-spectrum bandwidth is 50 MHz. Thus, the processing gain is: $N' = (25 \times 10^6)/(4.8 \times 10^3)$, which approximately equals 5000, or 37 dB.

Figure 5:
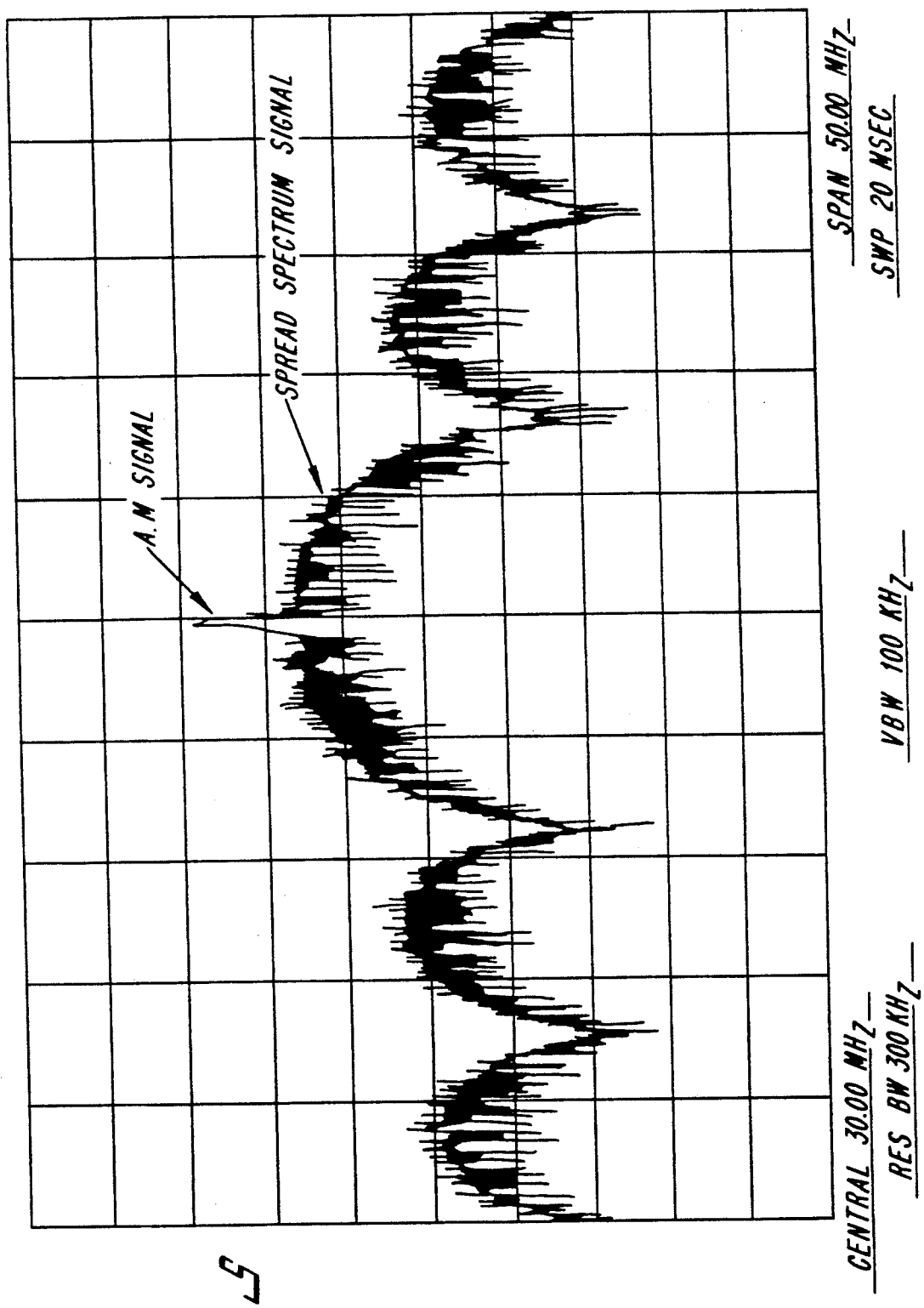
FIG. 5 shows the spectrum of a spread spectrum signal with an AM signal of equal power at its carrier frequency.

FIG. 5 shows the spectrum of this spread spectrum signal of an amplitude modulated 3 kHz sinusoidal signal, when they each have the same power level. The bandwidth of the AM waveform is 6 kHz. Both waveforms have the same carrier frequency.

FIG. 6 shows the demodulated square-wave data stream. This waveform has been processed by an "integrator" in the receiver, hence the triangular shaped waveform. Note that positive and negative peak voltages representing a 1-bit and 0-bit are clearly shown. FIG. 7 shows that the demodulated AM signal replicates the 3 kHz sine wave.

The AM signal does not degrade the reception of data because the spread spectrum receiver spreads the energy of the AM signal over 16 MHz, while compressing the spread spectrum signal back to its original 9.6 kHz bandwidth. The amount of the spread AM energy in the 9.6 kHz BPSK bandwidth is the original energy divided by N=1600 (or, equivalently, it is reduced by 32 dB). Since both waveforms initially were of equal power, the signal-to-noise ratio is now 32 dB, which is sufficient to obtain a very low error rate.

The spread spectrum signal does not interfere with the AM waveform because the spread spectrum power in the bandwidth of the AM signal is the original power in the spread spectrum signal divided by $N_1$, where $$N_1 = \frac{16 \text{ MHz}}{6 \text{ kHz}} = 2670 \text{ (or 33 dB)}$$

hence the signal-to-interference ratio of the demodulated sine wave is 33 dB.

The direct sequence modes of spread spectrum uses psuedo random sequences to generate the spreading sequence. While there are many different possible sequences, the most commonly used are "maximal-length" linear shift register sequences, often referred to as pseudo noise (PN) sequences. FIG. 8 shows a typical shift register sequence generator. FIG. 9 indicates the position of each switch $b_i$ to form a PN sequence of length L, where $$L = 2^N - 1$$

The characteristics of these sequences are indeed "noise like". To see this, if the spreading sequence is properly designed, it will have many of the randomness properties of a fair coin toss experiment where "1"=heads and "−1"=tails. These properties include the following:

1) In a long sequence, about ½ the chips will be +1 and ½ will be −1.
2) The length of a run of r chips of the same sign will occur about $L/2^r$ times in a sequence of L chips.
3) The autocorrelation of the sequence $PN_i(t)$ and $PN_i(t + \tau)$ is very small except in the vicinity of $\tau = 0$.
4) The cross-correlation of any two sequences $PN_i(t)$ and $PN_j(t + \tau)$ is small.

Code Division Multiple Access

Code division multiple access (CDMA) is a direct sequence spread spectrum system in which a number, at least two, of spread-spectrum signals communicate simultaneously, each operating over the same frequency band. In a CDMA system, each user is given a distinct chip code. This chip code identifies the user. For example, if a first user has a first chip code, $g_1(t)$, and a second user a second chip code, $g_2(t)$, etc., then a receiver, desiring to listen to the first user, receives at its antenna all of the energy sent by all of the users. However, after despreading the first user's signal, the receiver outputs all the energy of the first user but only a small fraction of the energies sent by the second, third, etc., users.

CDMA is interference limited. That is, the number of users that can use the same spectrum and still have acceptable performance is determined by the total interference power that all of the users, taken as a whole, generate in the receiver. Unless one takes great care in power control, those CDMA transmitters which are close to the receiver will cause the overwhelming interference. This effect is known as the "near-far" problem. In a mobile environment the near-far problem could be the dominant effect. Controlling the power of each individual mobile user is possible so that the received power from each mobile user is the same. This technique is called "adaptive power control". See U.S. Pat. Application having Filing Date of Nov. 16, 1990, entitled, "Adaptive Power Control Receiver," by Donald L. Schilling, which is incorporated herein by reference.

The Proposed PCN Spread Spectrum CDMA System

The PCN spread spectrum communications system of this patent is a CDMA system. Direct Sequence Code Division Multiple Access (CDMA) can significantly increase the use of spectrum. With CDMA, each user in a cell uses the same frequency band. However, each PCN CDMA signal has a separate pseudo random code which enables a receiver to distinguish a desired signal from the remaining signals. PCN users in adjacent cells use the same frequency band and the same bandwidth, and therefore "interfere" with one another. A received signal may appear somewhat noisier as the number of users' signals received by a PCN base station increases.

Each unwanted user's signal generates some interfering power whose magnitude depends on the processing gain. PCN users in adjacent cells increase the expected interfering energy compared to PCN users within a particular cell by about 50%, assuming that the PCN users are uniformly distributed throughout the adjacent cells. Since the interference increase factor is not severe, frequency reuse is not employed. Each spread spectrum cell can use a full 48 MHz band for transmission and a full 48 MHz band for reception. Hence, using a chip rate of twenty five million chips per second and a coding data rate of 32k bps results in approximately a processing gain of 750 chips per bit. It is well known to those skilled in the art that the number of PCN CDMA users is approximately equal to the processing gain. Thus, up to 750 users can operate in the 50 MHz bandwidth overlaying one or more fixed service microwave systems in the 1.85–1.99 GHz region.

Shared Spectrum Capability of CDMA PCN

An interesting aspect of the use of DS CDMA for cellular radio transmission is in the possibility of overlaying the DS CDMA PCN radio network on top of existing users occupying the frequency band of interest. That is, it is not necessary to supply to the spread spectrum users a frequency band which is completely devoid of other users. Rather, if the frequency band is partially occupied by various narrowband users, it is often possible to superimpose the DS CDMA signals on the same band in such a manner that both sets of users can co-exist.

A proposed PCN system geographic architecture is shown in FIG. 10. A multiplicity of microcells each having a PCN-base station, communicate with a plurality of PCN users.

To see that CDMA PCN can coexist with fixed service (FS) microwave users, the effect of the mobile PCN users on the FS microwave receiver and the effect of the FS microwave transmitter on a mobile PCN user must be examined.

Effect of PCN users on a FS Microwave Receiver

Figure 12:
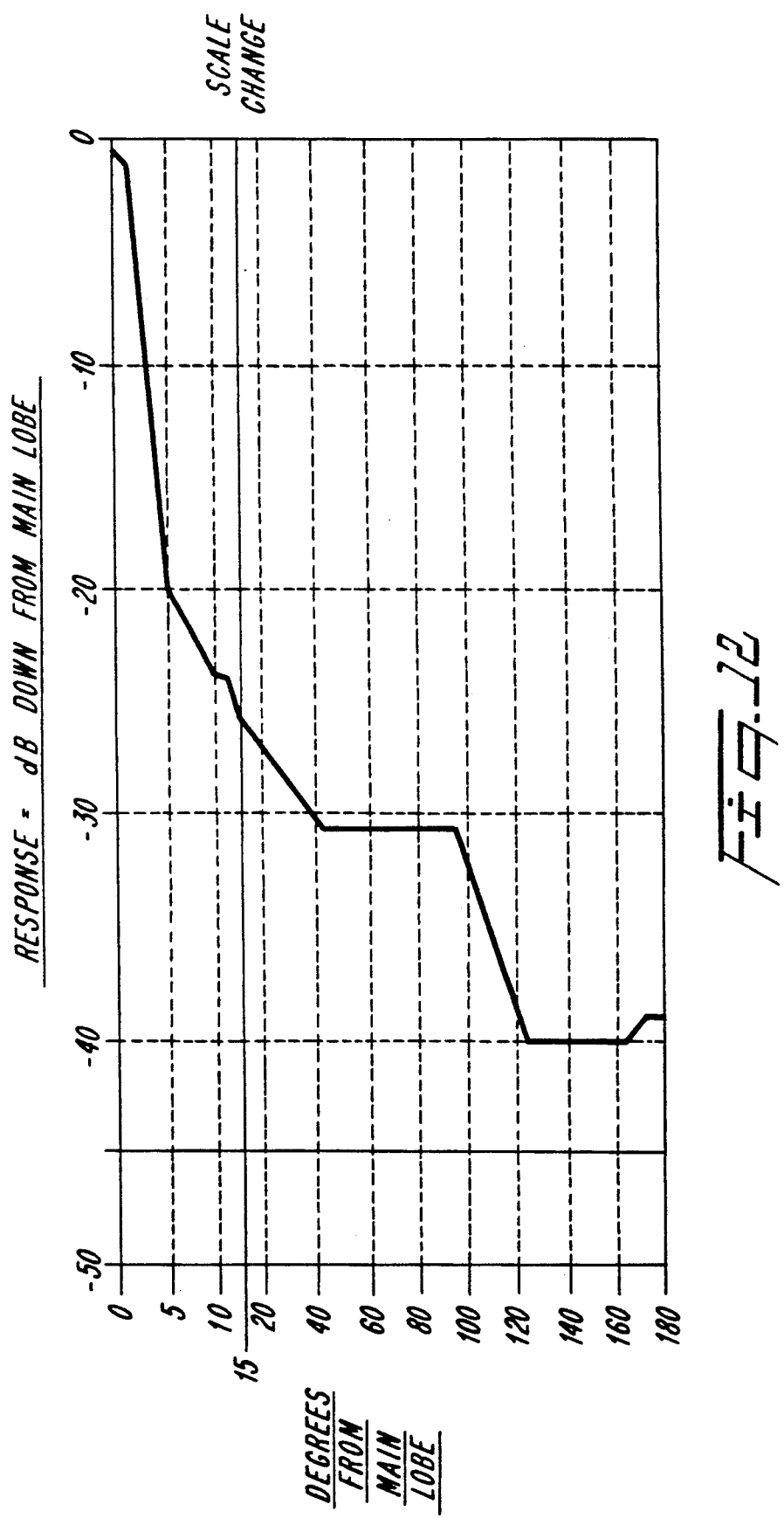
FIG. 12 illustrates a typical fixed service microwave user antenna pattern versus elevation angle.
Figure 17A:
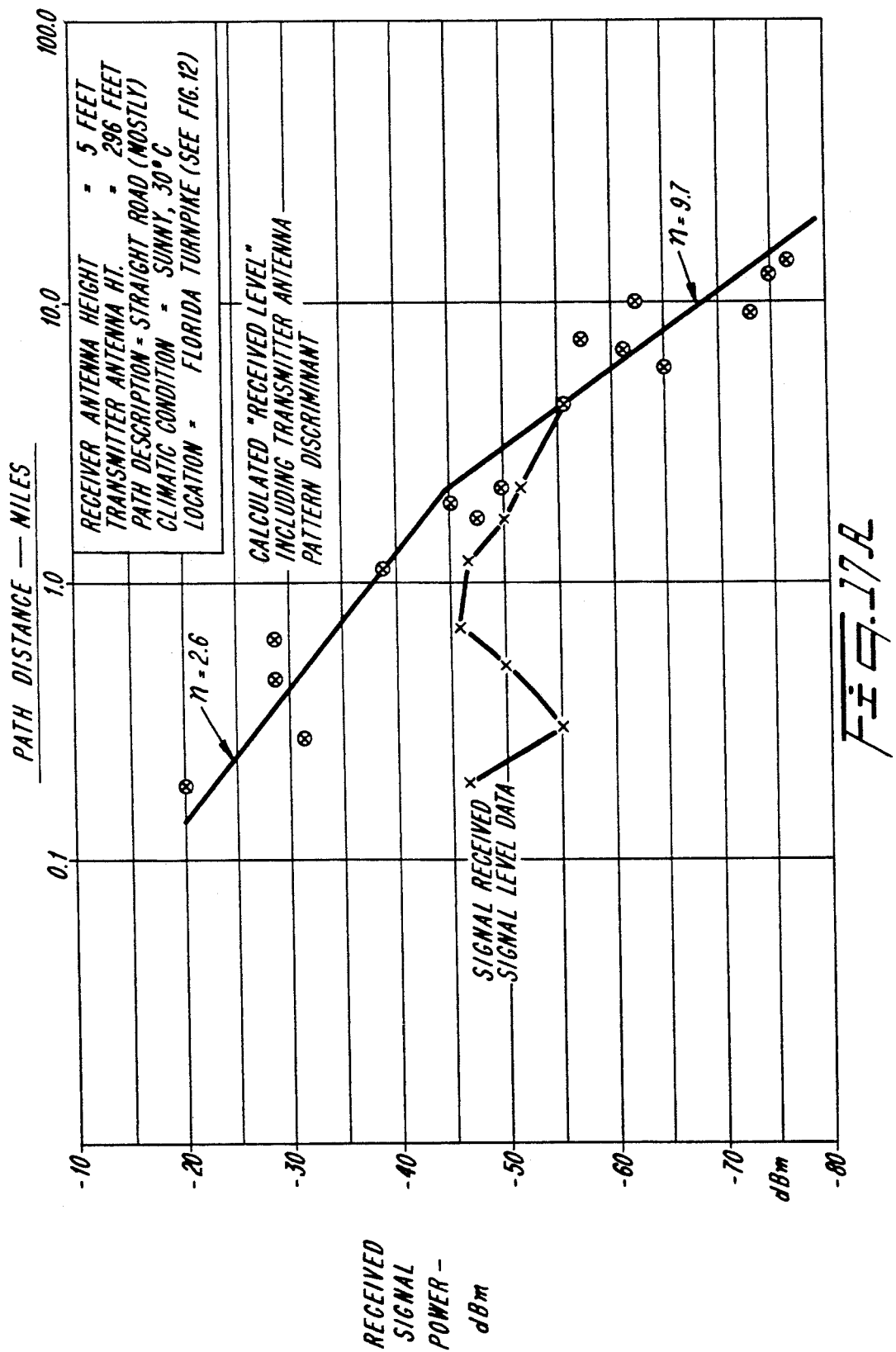
Figure 17B:
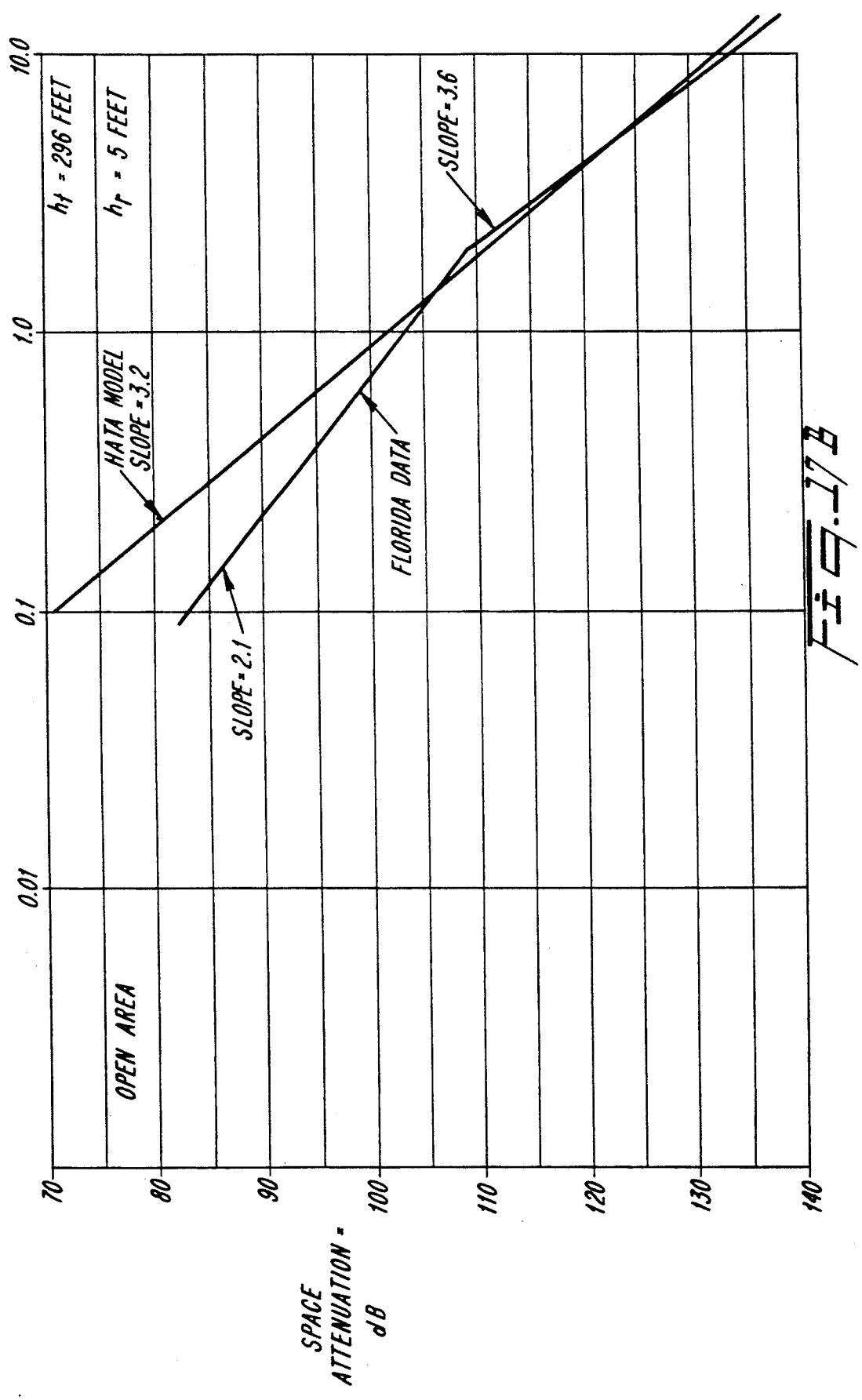
Figure 17C:
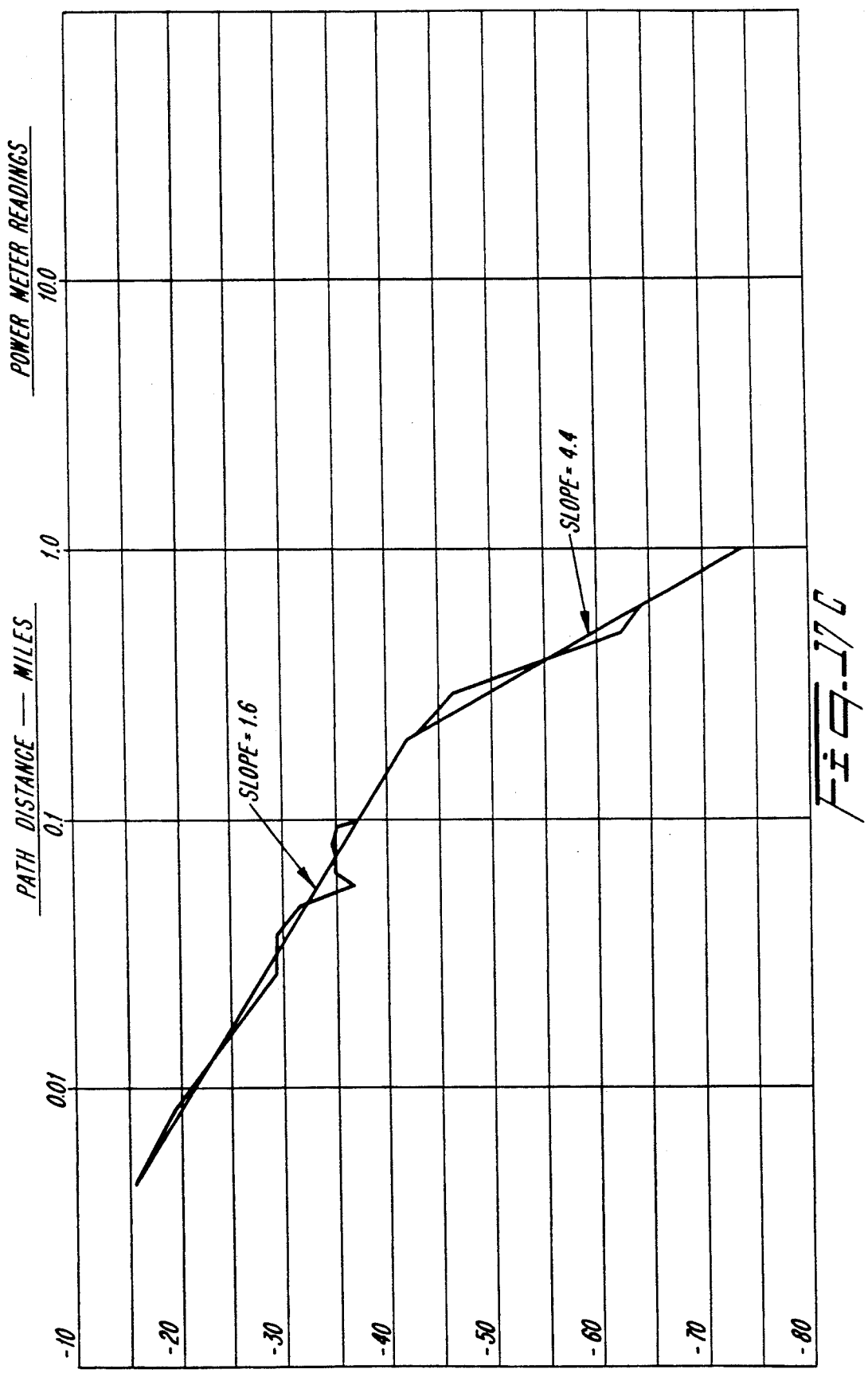
Figure 17E:
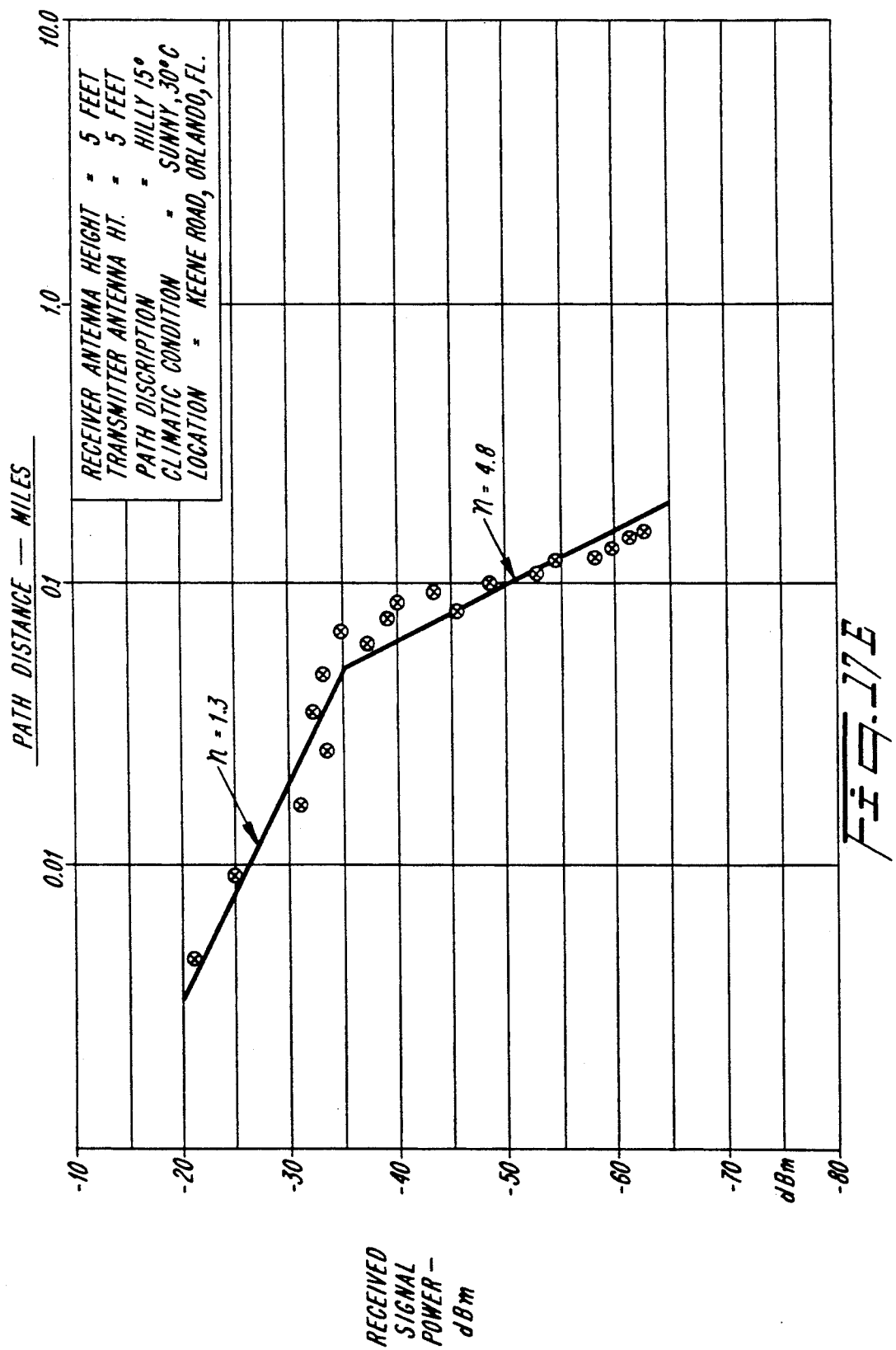
Figure 17H:
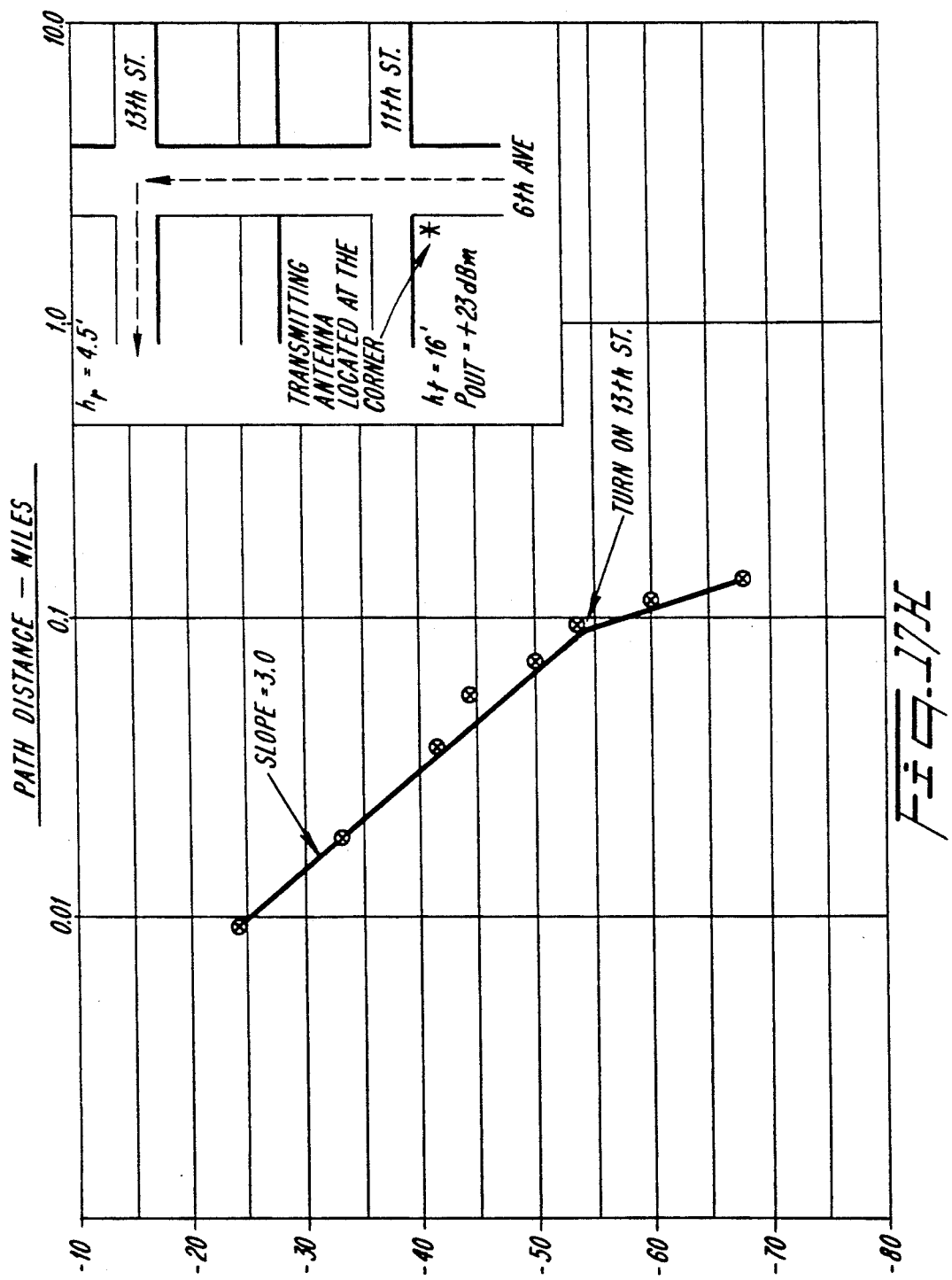
Figure 17I:
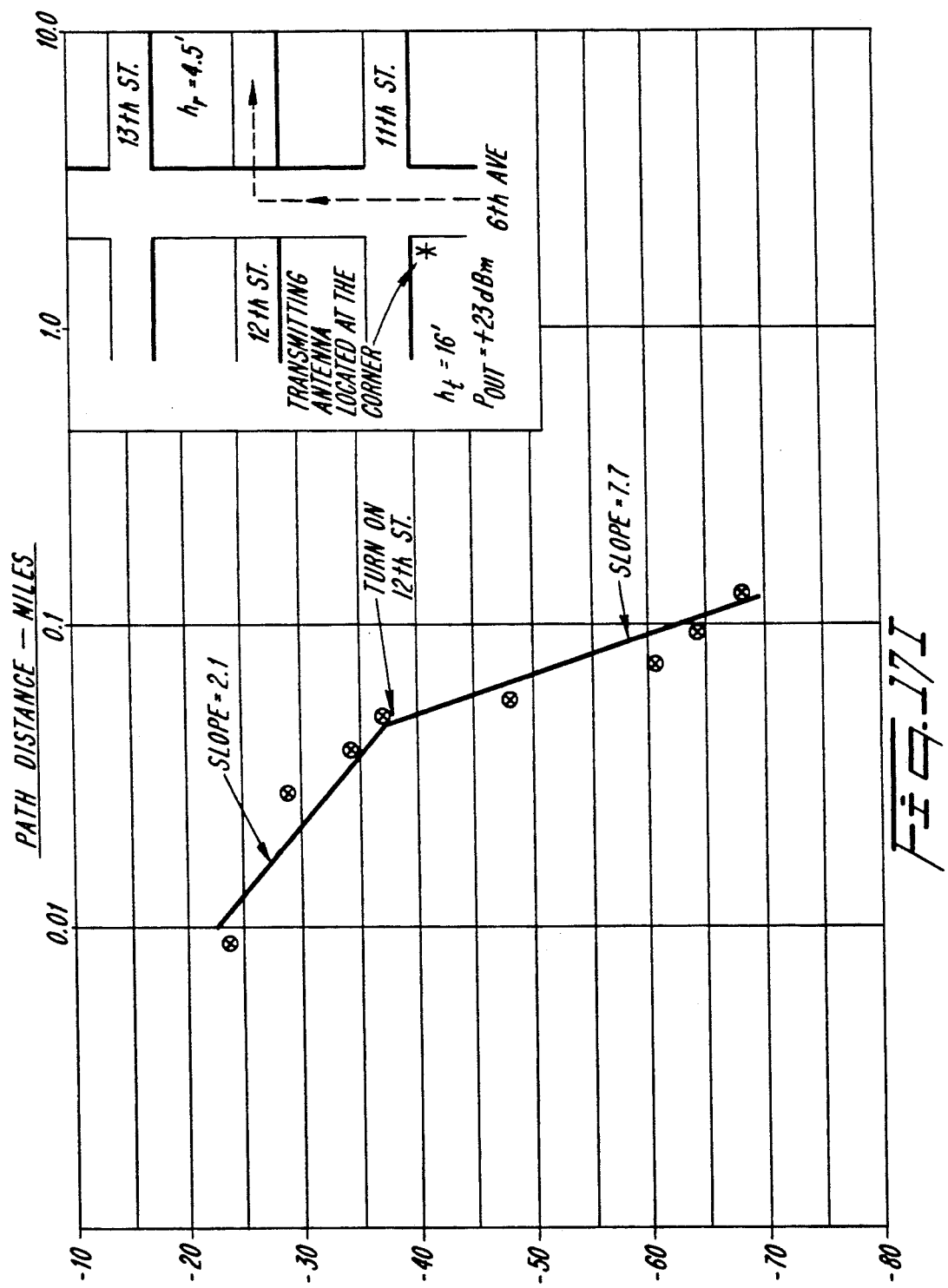
Figure 17J:
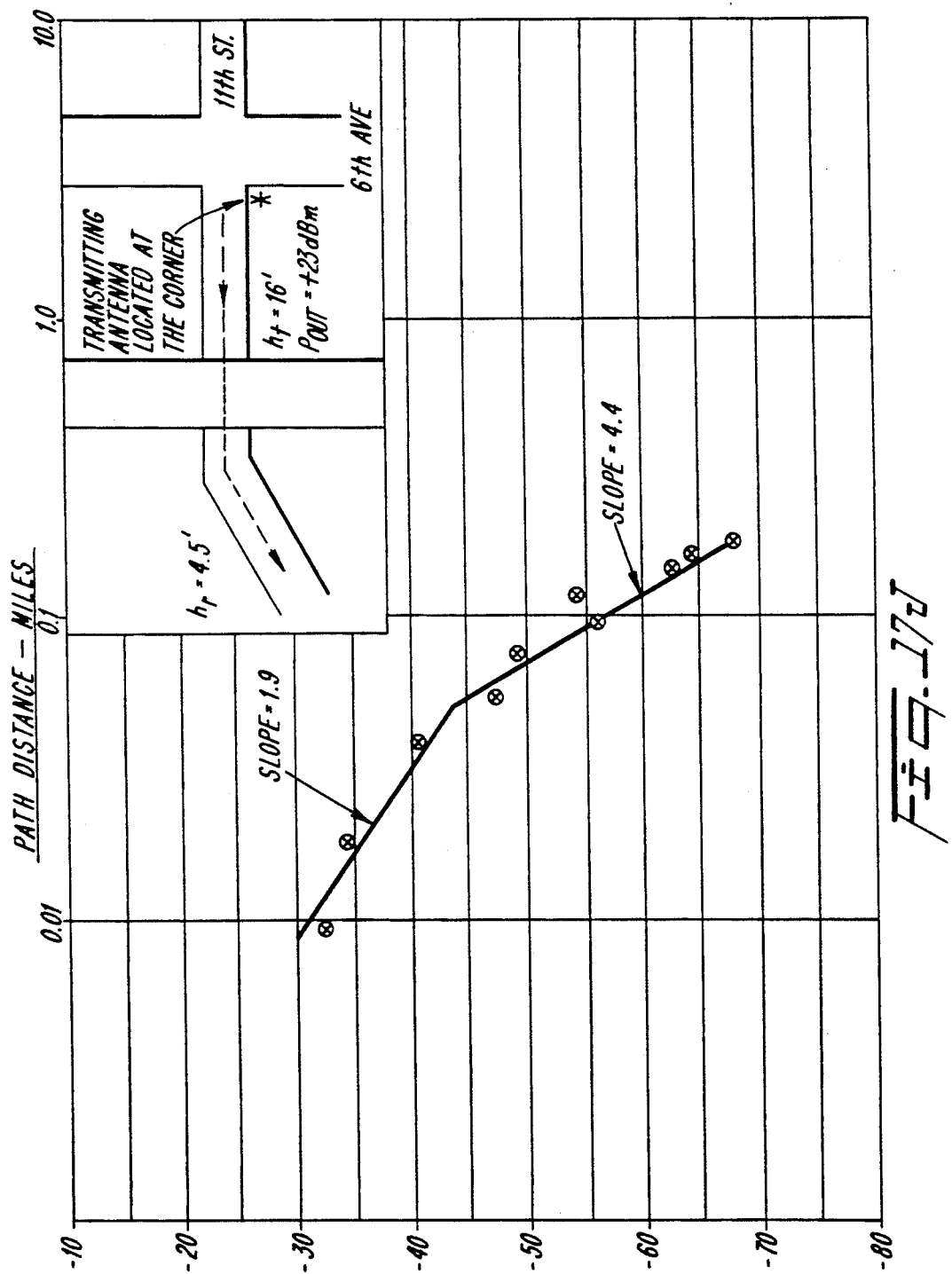
Figure 17K:
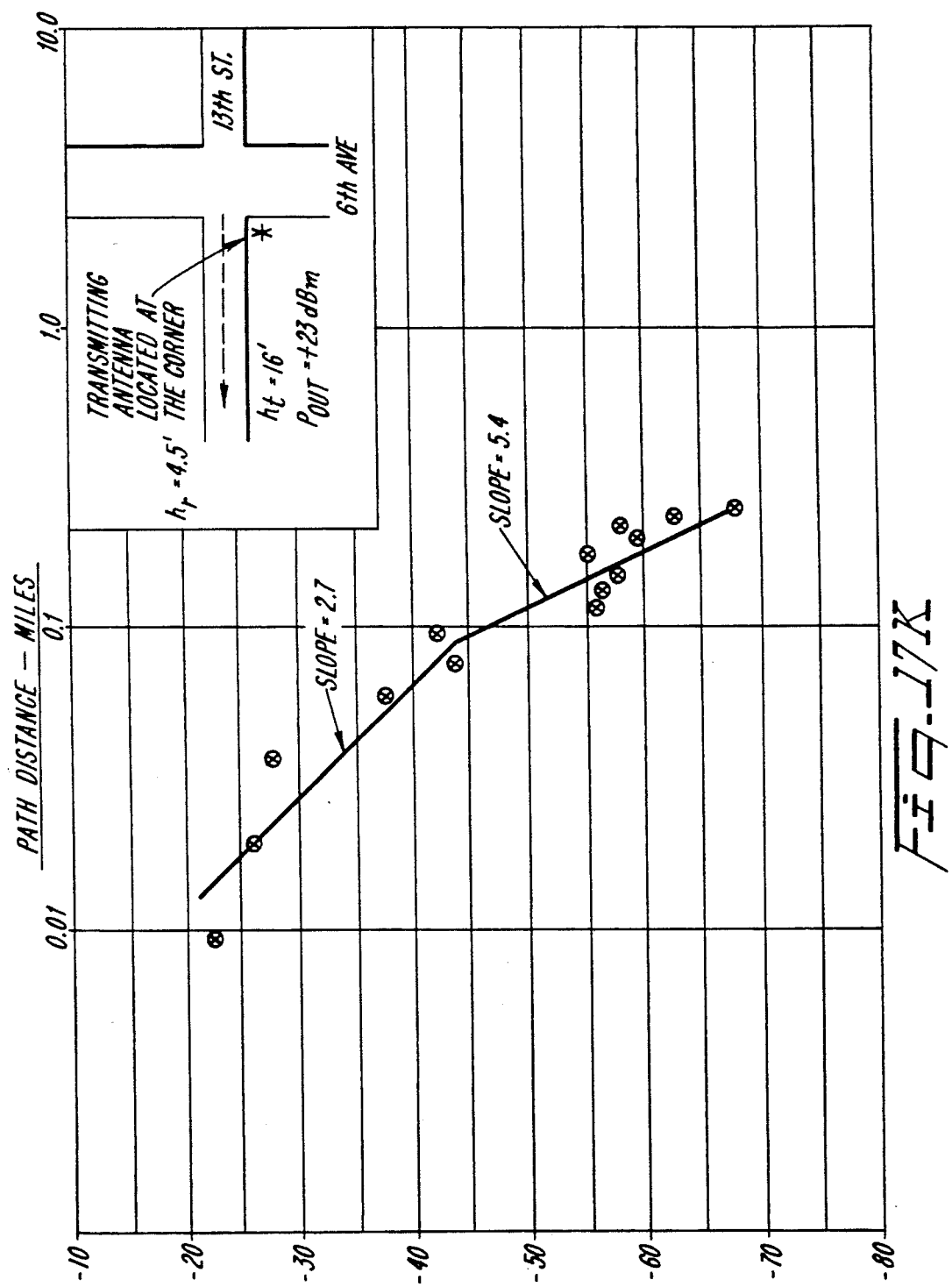

To examine the effect of the mobile PCN user on a FS microwave receiver, refer to FIG. 11. A PCN user is shown whose transmission is received by a microwave receiver. The PCN user's signal is attenuated by (1) path loss and (2) antenna directivity which results in a significant decrease in the FS microwave antenna gain, FIG. 12, in the direction of the PCN user.

For example, the link parameters for a typical 2 GHz FS link and for a PCN system are given in FIGS. 13A and 13B. The free space propagation loss, $L_{uw}$, between FS transmitter and receiver is $$L_{uw} = 103 + 20 \log(R), \text{ dB} \quad (1)$$

while the path loss LPCN between a PCN user and FS receiver typically is not the free space path loss as it is affected by multipath. A standard representation, approved by the CCIR is:

$$L_{PCN} = 135.5 + 33.21 \log(d). \text{ dB} \quad (2)$$

In these equations R is the distance, in miles, between transmitter and receiver and d is the distance, in miles, between PCN and receiver, see FIG. 11.

Using equations (1) and (2) and FIG. 13, the ratio of the received signal power $P_s$ from the FS microwave transmitter to the received interference $P_I$ of the PCN user(s) can be determined and is given the FIG. 14. In FIG. 14 it is assumed that multiple PCN users are all congregated at the same location, clearly a worst-case result. It also should be noted that if $P_s/P_I = 23$ dB the probability of a symbol being in error before FEC decoding is $10^{-3}$. The coding gain of a typical FS microwave receiver is 3 dB.

Assuming that there are 100 active PCN users/cell, uniformly distributed across the cell, and there are 32 (or more) cells facing the FS microwave receiver, then the resulting $P_s/P_I = 53$ dB, which provides a signal to noise ratio of 23 dB with a 30 dB fade margin. This corresponds to an undecoded error rate of $10^{-3}$.

The addition of the notch filter at the PCN unit and/or PCN base station significally reduces these already low values such that interference with a fixed-service microwave user is negligible or non existent. When the spread-spectrum system overlaps the antenna bean and is near the receiver of the fixed-service microwave system the notch filter provides more than 15 dB additional attenuation to the spread-spectrum signal power in the band of the notch. When the total power of the spread-spectrum system is spread over 48 MHz and the FS bandwidth is less than 10 MHz, only 20% of the spread-spectrum power is available to interfere with the FS microwave system. Since most of the time the spread-spectrum PCN-base station and PCN unit are at a remote distance from a fixed-service microwave station, i.e. a fixed-service microwave station is located outside the normal geographic coverage area of a cell, the path loss from the PCN-base station or PCN user varies at an exponent greater than two, and typically by the fourth power. Also, most of the time a PCN-base station and PCN user are not operating within the antenna beam of a fixed-service microwave station. Thus, the power of the spread-spectrum signal at the fixed-service microwave user is reduced by 20 dB to 40 dB.

Effect of a FS Microwave Transmitter on a PCN User

To calculate the effect of the FS microwave transmitter on PCN users, assume that there are 100 users uniformly distributed throughout each cell and consider those cells "facing" the microwave transmitter. FIG. 15 shows the region where the bit error rate, before FEC decoding, exceeds $10^{-2}$. The dimensions of each cell are 1200 feet by 1200 feet. The area shown, therefore constitutes approximately 2.2% of the cell area. Hence 2 to 3 users will be inconvenienced within that single cell. No users will be inconvenienced outside the region shown.

PCN Field Test

Experiments were conducted in the frequency band 1850–1990 MHz, to conduct field tests of a PCN system employing direct sequence spread spectrum CDMA. The novel application seen here is that the band chosen for experimentation is one which is used today for microwave transmission. The field tests are intended to verify that spread spectrum can share a band with existing users and thereby increase the utilization efficiency of a frequency band. These tests also provide important quantitative information, such as how many CDMA users and at what power level, can operate in the vicinity of a microwave receiver without degrading the microwave user's performance, and how many CDMA users can operate in the vicinity of a microwave transmitter before the CDMA user's performance is degraded.

The field tests fall into two categories: measurement of the interference produced by the spread spectrum PCN on the existing microwave users, and measurement of the interference produced by the existing microwave users on both the mobile user and the cell. These experiments were performed in New York and Orlando, Fla. during 1990 and 1991.

FIG. 16 shows a typical, fixed location, existing microwave transmitter-receiver site. The mobile users 1 and 2 each transmit to the cell using the frequency band 1860–1910 MHz and receive from the cell using the band 1930–1980 MHz. Mobile user 3–50 is a transmit-only user which simulates 48 users transmitting from the same site. The power level of mobile users 1 and 2 is adjustable from 100 uW to 100 mW, the power level of mobile users 3–50 will be adjustable from 4.8 mW to 4.8 W, and the power level of the cell is adjustable from 5 mW to 5 W. Each adjustment is made independently of the others. Each mobile user had a notch filer located at the frequency and with a fixed-service microwave bandwidth of a fixed-service microwave user.

Measurement 1

Measurement of the Interference Product by PCN on Existing Microwave Receiver The four vans, which include the mobile users as well as the cell, shown in FIG. 16, were moved relative to a microwave receiver, and the bit error rate (BER) measured at each position. The measured BERs are compared to the interference-free BER obtained when the mobile system is off. Different transmit powers from the cell and from the mobile users are employed in order to determine the robustness of the system.

Measurements were taken during different times of the day and night, and at several receiver sites.

Measurement 2

Measurement of the Interface Produces by the Existing Microwave Transmitters on the PCN The position of the four vans shown in FIG. 16 varied relative to the existing microwave transmitters to determine the sensitivity of the PC to such interference. Both qualitative voice measurements and quantitative bit-error-rate measurements were made.

The robustness of the system to fading also was determined. This measurement of the effect of the propagation characteristics of the channel on the PCN were made by positioning the cell and mobile users in different parts of Orlando. BER measurements were taken, and a comparison to $r^2$, $r^{3.6}$ and $r^4$ curves were made in an attempt to better characterize this PCN channel. FIGS. 17A–17K plot attenuation versus distance based on these experimental results.

Fading Due to Multipath

The received waveform often includes numerous similar signals each delayed with respect to one another. This delay is due to the fact that the antenna transmits the same signal, with equal power, in all directions simultaneously. Some of these signals, after bouncing off of cars, buildings, roadways, trees, people, etc., are received after being delayed. These are called multipath signals. Thus, the total received signal is:

$$v_R(t) = \sum_{i=1}^{N} a_i [d_i(t - \tau_i) \oplus g_i(t - \tau_i)] \cos w_o(t - \tau_i)$$

where $d_i$ is the data, $g_i$ is the pseudo-noise (PN) sequence and $\oplus$ indicates modulo-2 addition.

If several $\tau_i$ are clustered together so that the difference between the largest $\tau_i = \tau_k$ and the smallest $\tau_i = \tau_1$, is less than the duration of a chip, i.e., $\tau_k - \tau_1 < T_c$, then the received signal $v_R(t)$ can be severely attenuated. This is called "fading" due to multipath.

FIG. 18 shows the spectrum of a 24 Mchips/s direct sequence spread spectrum signal at a carrier frequency of 1.956 GHz when multipath fading is present. Note that a 8 dB deep, 15 MHz wide fade can result. Other experiments performed indicate that typical fades are 10 dB or greater and 1–3 MHz or more wide. Thus, a 48 MHz bandwidth, wideband spread spectrum signal is relatively insensitive to multipath fades, while "narrowband" signals having bandwidths of less than 3 MHz can be greatly attenuated due to fading.

Based on these findings personal communication networks according to the present invention using CDMA have numerous advantages as compared to FDMA and TDMA.

They can be used in a frequency band that has existing users, and therefore this means of communication represents an effective, efficient mode of frequency band utilization.

Broadband-CDMA modulation is more robust in the presence of multipath. For example, if the direct path is 600 feet and the multipath is 800 feet, the two returns are separated by 200 feet or 200 ns. Using broadband-CMDA modulation the chip rate of 25 Mchips/s means that the two returns are uncorrelated. Indeed, multipath returns exceeding 40 feet are uncorrelated and do not result in fading.

CDMA has the potential of allowing a larger number of users, that is, of being a more efficient system than either TDMA or FDMA. This improvement can also be translated into lower power and hence longer life for batteries.

In this decade, the CDMA PCN system is likely to be widely used for voice communications, facsimile transmission and other types of data transmission. Its versatility could well result in this system attaining a major share of the world's communication market.

It will be apparent to those skilled in the art that various modifications can be made to the spread spectrum CDMA communications system using the notch filter of the instant invention without departing from the scope or spirit of the invention, and it is intended that the present invention cover modifications and variations of the spread spectrum CDMA communications system using the notch filter provided they come in the scope of the appended claims and their equivalents.

I claim:

1. A spread spectrum CDMA communications system for communicating data, including digitized voice signals, between a plurality of personal-communications network (PCN) units, spread spectrum communications system located within a same geographical region as occupied by a microwave system using a microwave frequency and fixed-service bandwidth, said spread spectrum CDMA communications system comprising:

a plurality of PCN-base stations located within the mobile cellular system for communicating data to the plurality of PCN units, each of said PCN-base stations including, base means for converting the format of the data for output to communicate over radio waves;

base-product means for spread spectrum processing the data;

base-filter means for notching a spectrum of the spread-spectrum-processed-converted data at the microwave frequency and microwave bandwidth of said microwave system; and base means for transmitting across the fixed-service bandwidth, the spread-spectrum-processed-converted data from the PCN-base station to a PCN unit;

a plurality of PCN units, each of said PCN units including, a PCN antenna; and

PCN detection means coupled to said PCN antenna and including PCN-spread-spectrum-processing means, for recovering data communicated from said PCN-base station.

2. The spread spectrum communications system as set forth in claim 1 wherein said PCN detection means includes means for converting the format of the data for output to a user.

3. The spread spectrum communications system as set forth in claim 1 wherein said PCN-spread-spectrum-processing means includes means for storing a local chip code for comparison to signals received for recovering data sent from said PCN-base station to said PCN unit.

4. The spread spectrum communications system as set forth in claim 1 wherein said PCN-spread-spectrum-processing means includes means for synchronizing said PCN-spread-spectrum-processing means to received signals.

5. The spread spectrum communications system as set forth in claim 1 wherein said PCN-spread-spectrum processing means at said PCN-base station includes means for processing data for particular PCN units with a selected chip code.

6. The spread spectrum CDMA communications system as set forth in claim 1 wherein said base-filter means provides more than 10 db attenuation in the fixed-service bandwidth.

7. A spread spectrum CDMA communications system for communicating data, including digitized voice signals, between a plurality of personal-communications network (PCN) units, said spread spectrum communications system located within a same geographical region as occupied by a microwave system using a microwave frequency and fixed-service bandwidth, said spread spectrum CDMA communications system comprising:

a plurality of PCN units, located within a same geographical region as occupied by the microwave system for communicating data to a plurality of users, each of said PCN units including, PCN-product means for spread spectrum processing the data;

PCN-filter means for notching a spectrum of the spread-spectrum-processed-converted data at the microwave frequency and the microwave bandwidth of said microwave system; and PCN means for transmitting across the fixed-service bandwidth, the spread-spectrum-processed-converted data from said PCN unit to a PCN-base station;

a PCN-base station including, a base antenna; and base detection means including base-spread-spectrum-processing means, for recovering data communicated from said PCN unit.

8. The spread spectrum communications system as set forth in claim 7 wherein said base detection means includes means for converting the format of the data for output to a user.

9. The spread spectrum communications system as set forth in claim 7 wherein said base-spread-spectrum-processing means includes means for storing a local chip code for comparison to signals received for recovering data sent from said PCN-base station to said PCN unit.

10. The spread spectrum communications system as set forth in claim 7 wherein said base-spread-spectrum-processing means includes means for synchronizing said processing means to received signals.

11. The spread spectrum communications system as set forth in claim 7 wherein said base-spread-spectrum-processing means at said PCN-base station includes means for processing data for particular PCN units with a selected-chip code.

12. The spread spectrum communications system as set forth in claim 7 wherein said means for transmitting transmits data in a time division format.

13. The spread spectrum CDMA communications system as set forth in claim 7 wherein said PCN-filter means provides more than 10 dB attenuation in the fixed-service bandwidth.

14. A spread-spectrum transmitter for use with a PCN-system of a spread spectrum CDMA communications system for communicating data, including digitized voice signals between a plurality of personal-communications network (PCN) units, said spread spectrum communications system located within a same geographical region as occupied by a microwave system, said spread-spectrum transmitter comprising:

means for converting the format of the data for output to communicate over radio waves;

product means for spread spectrum processing the data;

filter means for notching a spectrum of the data spread-spectrum-processed-converted at the microwave frequency and microwave bandwidth of said microwave system; and means for transmitting across a bandwidth of said microwave system, the notched-spread-spectrum-processed-converted data.

15. The spread-spectrum transmitter as set forth in claim 14 wherein said notch means includes a notch filter having band rejection at the plurality of predetermined channels.

16. The spread-spectrum transmitter as set forth in claim 14 wherein said notch means includes an adjustable-notch filter having band rejection at adjustable channels.

17. The spread-spectrum transmitter as set forth in claim 15 wherein said filter means provides more than 15 db attenuation in the bandwidth of said microwave system.

* * * * *